(12) United States Patent
Petrovic et al.

(10) Patent No.: US 7,899,011 B2
(45) Date of Patent: *Mar. 1, 2011

(54) SUPPORT OF GUARANTEED BIT-RATE TRAFFIC FOR UPLINK TRANSMISSIONS

(75) Inventors: Dragan Petrovic, Darmstadt (DE);
Joachim Lohr, Darmstadt (DE);
Frederic Charpentier, Berlin (DE);
Akito Fukui, Yokohama (JP)

(73) Assignee: Panasonic Corporation, Osaka (JP)

( * ) Notice: Subject to any disclaimer, the term of this patent is extended or adjusted under 35 U.S.C. 154(b) by 417 days.

This patent is subject to a terminal disclaimer.

(21) Appl. No.: 12/049,819

(22) Filed: Mar. 17, 2008

(65) Prior Publication Data

US 2008/0170504 A1 Jul. 17, 2008

Related U.S. Application Data

(63) Continuation of application No. 11/302,493, filed on Dec. 14, 2005, now Pat. No. 7,362,726.

(30) Foreign Application Priority Data

Dec. 15, 2004 (EP) .................................. 04029710

(51) Int. Cl.
*H04W 4/00* (2009.01)
*H04W 36/00* (2009.01)
*H04W 72/00* (2009.01)

(52) U.S. Cl. ...................... 370/329; 370/332; 370/333; 455/453; 455/438; 455/439

(58) Field of Classification Search ......... 370/328–339; 455/436–439, 453
See application file for complete search history.

(56) References Cited

U.S. PATENT DOCUMENTS 6,871,071 B2 3/2005 Takao (Continued)

FOREIGN PATENT DOCUMENTS

EP 1447938 8/2004

(Continued)

OTHER PUBLICATIONS

European Search Report dated Jun. 17, 2005.

(Continued)

*Primary Examiner*—Un C Cho
(74) *Attorney, Agent, or Firm*—Dickinson Wright PLLC

(57) ABSTRACT

The invention relates to a method for providing measurements on a bit-rate provided to scheduled data having a guaranteed bit-rate and being transmitted on at least one dedicated uplink data channel by at least user equipment via a C-RNC. Further, the invention also relates to a method for initiating congestion control for scheduled data of at least one guaranteed bit-rate priority class in a mobile communication system. Moreover, the invention relates to a C-RNC as well as a serving radio network controller performing these methods. To enable the C-RNC within a mobile communication system to perform congestion control for uplink transmissions having a guaranteed bit-rate the invention suggests to provide the C-RNC with a bit-rate being provided to scheduled data of the guaranteed bit-rate priority class using common or dedicated measurement procedures. This provided bit-rate is evaluated and taken as a basis for deciding on whether congestion control for data of the priority class needs to be performed.

11 Claims, 14 Drawing Sheets

U.S. PATENT DOCUMENTS

| | | | |
|---|---|---|---|
| 7,362,726 B2* | 4/2008 | Petrovic et al. | 370/329 |
| 2003/0103476 A1 | 6/2003 | Choi et al. | |
| 2004/0066744 A1 | 4/2004 | Agin | |
| 2004/0071086 A1 | 4/2004 | Haumont et al. | |
| 2004/0090934 A1 | 5/2004 | Cha et al. | |
| 2004/0102194 A1 | 5/2004 | Naghian | |
| 2004/0203707 A1 | 10/2004 | Akhteruzzaman | |
| 2004/0209624 A1 | 10/2004 | Rune et al. | |
| 2004/0228317 A1 | 11/2004 | Tolli | |
| 2005/0025100 A1 | 2/2005 | Lee et al. | |
| 2005/0249148 A1 | 11/2005 | Nakamata | |

FOREIGN PATENT DOCUMENTS

| | | |
|---|---|---|
| JP | 2004-525550 | 8/2004 |
| JP | 2004525550 | 8/2004 |
| JP | 2004-248300 | 9/2004 |
| WO | 0163855 | 8/2001 |
| WO | 02100053 | 12/2002 |
| WO | 03001681 | 1/2003 |
| WO | 2004064441 | 7/2004 |
| WO | 2005109941 | 11/2005 |

OTHER PUBLICATIONS

Japanese Office Action dated May 8, 2007 with English translation.
Japanese Office Action dated Nov. 14, 2006 with English translation.
European Search Report dated Sep. 27, 2006.
English Abstract of JP2004-248300.
Japanese Office Action dated Nov. 17, 2009 with English translation thereof.
"UTRAN Overall Description," 3GPP TS 25.401 v6.1.0, Technical Specification, $3^{rd}$ Generation Partnership Project, Technical Specification Group Radio Access Network, www.3gpp.org, pp. 1-44, Jun. 2003.
"UTRAN Iub Interface NBAP Signalling," 3GPP TS 25.433 v6.1.0, Technical Specification, $3^{rd}$ Generation Partnership Project, Technical Specification Group Radio Access Network, www.3gpp.org, pp. 1-689, Mar. 2004.
"Feasibility Study for Enhanced Uplink for UTRA FDD," 3GPP TR 25.896 v6.0.0, Technical Report, $3^{rd}$ Generation Partnership Project, Technical Specification Group Radio Access Network, www.3gpp.org, pp. 1-179, Mar. 2004.

* cited by examiner

SUPPORT OF GUARANTEED BIT-RATE TRAFFIC FOR UPLINK TRANSMISSIONS

This application is a continuation of U.S. application Ser. No. 11/302,493 filed Dec. 14, 2005, which is based on European application number 04029710.3 filed Dec. 15, 2004, the entire contents of which are incorporated by reference herein.

FIELD OF THE INVENTION

The invention relates to a method for providing measurements on a provided bit-rate being provided to scheduled data having a guaranteed bit-rate and being transmitted on at least one dedicated uplink data channel by at least user equipment via a controlling radio network controller in a mobile communication system. Further, the invention also relates to a method for initiating congestion control for scheduled data of at least one guaranteed bit-rate priority class in a mobile communication system. Moreover, the invention relates to a controlling radio network controller as well as a serving radio network controller performing these methods.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Packet Scheduling

Packet scheduling is a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between the serving RNC (S-RNC) and the user equipment. The user equipment is allowed to autonomously choose among the allocated transport format combinations based on its own status e.g. available power and buffer status.

In current UMTS R99/R4/R5 specifications there is no control on time imposed on the uplink user equipment transmissions. The scheduler may e.g. operate on transmission time interval basis. In UMTS Release 6 for enhanced uplink dedicated channels (E-DCHs) the scheduler may operate with higher scheduling frequency with respect to legacy channels (on a short TTI—e.g. 2 ms—basis). This may impose certain serve order of the terminals while maintaining resources on allocation by a Node B on the basis of the noise rise.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

In the sequel two different architectures will be discussed. They are defined with respect to logical distribution of functions across network elements. In actual network deployment, each architecture may have different physical realizations meaning that two or more network elements may be combined into a single physical node.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3.

Respective RNCs are called Serving RNC (S-RNC) and Drift RNC (D-RNC). It is also possible and often the case that C-RNC and D-RNC are identical and therefore abbreviations S-RNC or RNC are used.

Radio Mobility Management

Radio Mobility Management for Rel99/4/5 UTRAN

Before explaining some procedures connected to mobility management, some terms frequently used in the following are defined first.

A radio link may be defined as a logical association between single UE and a single UTRAN access point. Its physical realization comprises radio bearer transmissions.

A handover may be understood as a transfer of a UE connection from one radio bearer to another (hard handover) with a temporary break in connection or inclusion/exclusion of a radio bearer to/from UE connection so that UE is constantly connected UTRAN (soft handover). Soft handover is specific for networks employing Code Division Multiple Access (CDMA) technology. Handover execution may controlled by S-RNC in the mobile radio network when taking the present UTRAN architecture as an example.

The active set associated to a UE comprises a set of radio links simultaneously involved in a specific communication service between UE and radio network. An active set update procedure may be employed to modify the active set of the communication between UE and UTRAN, for example during soft-handover. The procedure may comprise three functions: radio link addition, radio link removal and combined radio link addition and removal. The maximum number of simultaneous radio links is set to eight. New radio links are added to the active set once the pilot signal strengths of respective base stations exceed certain threshold relative to the pilot signal of the strongest member within active set.

A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths.

Pilot signal measurements may be reported to the network (e.g. to S-RNC) from UE by means of RRC signaling. Before sending measurement results, some filtering is usually performed to average out the fast fading. Typical filtering duration may be about 200 ms contributing to handover delay. Based on measurement results, the network (e.g. S-RNC) may decide to trigger the execution of one of the functions of active set update procedure (addition/removal of a Node B to/from current active set).

Radio Mobility Management for E-DCH

In Release 6 of UMTS it is presently foreseen to support soft handover for the E-DCH transmissions. However the active sets for a legacy DCH (Dedicated CHannel) and E-DCH are generally different.

Common and Dedicated Measurements on the Iub Interface

Common and dedicated measurement procedures are commonly initiated by sending a common/dedicated measurement initiation message from a C-RNC to a connected Node B using the Node B Control Port. Upon reception, the Node B initiates the requested measurement according to the parameters given in the request. The addressed Node B sends a common/dedicated measurement report to the C-RNC in response to the initiation request. The request sent by the C-RNC as well as the reports sent by the addresses Node B comprise Measurement ID IE having a Measurement ID set in order to allow an association between a measurement request and the corresponding reports.

Common measurement procedures on the Iub interface are used for measurements on common resource in Node B. Analogously, dedicated measurement procedures on the Iub interface are used for measurements on dedicated resource in Node B Both types of procedures may be configured for periodic, event-triggered and immediate type of reporting (see 3GPP TS 25.433: "UTRAN Iub Interface NBAP Signaling", version 6.1.0).

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-e in the following. The entities of this new sub-layer, which will be described in more detail in the following sections, may be located in user equipment and Node B. On user equipment side, the MAC-e performs the new task of multiplexing upper layer data (e.g. MAC-d) data into the new enhanced transport channels and operating HARQ protocol transmitting entities.

E-DCH MAC Architecture—UE side

The MAC-e entity at the UE is depicted in more detail in FIG. 4. There are M different data flows (MAC-d) carrying data packets from different applications to be transmitted from UE to Node B. These data flows can have different QoS requirements (e.g. delay and error requirements) and may require different configuration of HARQ instances. Each MAC-d flow represents a logical unit to which specific physical channel (e.g. gain factor) and HARQ (e.g. maximum number of retransmissions) attributes can be assigned.

Further, MAC-d multiplexing is supported for an E-DCH, i.e. several logical channels with different priorities may be multiplexed onto the same MAC-d flow. Therefore the data from one MAC-d flow can be fed into different Priority Queues. The selection of an appropriate transport format for the transmission of data on E-DCH is done in the TF Selection entity which represents a function entity. The transport format selection is based on the available transmit power, priorities, e.g. logical channel priorities, and associated control signaling (HARQ and scheduling related control signaling) received from a Node B. The HARQ entity handles the retransmission functionality for the user. One HARQ entity supports multiple HARQ processes. The HARQ entity handles all HARQ related functionalities required. MAC-e entity receives scheduling information from Node B (network side) via Layer-1 signaling as shown in FIG. 4.

E-DCH MAC Architecture—UTRAN side

In soft handover operation it may be assume that the MAC-e entities are distributed across Node B (MAC-$e_b$) and S-RNC (MAC-$e_s$) on UTRAN side. The scheduler in Node B chooses the active users among these entities and performs rate control through a commanded rate, suggested rate or TFC threshold that limits the active user (UE) to a subset of the TCFS. Every MAC-e entity corresponds to a user (UE). In FIG. 5 the Node B's MAC-e architecture is depicted in more detail. It can be noted that each HARQ Retransmission entity is assigned certain amount of the soft buffer memory for combining the bits of the packets from outstanding retransmissions. Once a packet is received successfully, it is forwarded to the reordering buffer providing the in-sequence delivery to upper layer.

It may be assumed that the reordering buffer resides in S-RNC during soft handover. In FIG. 6 the S-RNC's MAC-e architecture which comprises the reordering buffer of the corresponding user (UE) is shown. The number of reordering buffers is equal to the number of data flows in the corresponding MAC-e entity on UE side. Data and control information is sent from all Node Bs within active set to S-RNC during soft handover.

It should be noted that the required soft buffer size depends on the used HARQ scheme, e.g. an HARQ scheme using incremental redundancy (IR) requires more soft buffer than one with chase combining (CC).

Reordering Function

Several data flows may be multiplexed into one MAC-e PDU on UE side to improve frame fill efficiency. If RLC protocol is configured to work in the acknowledged (AM) mode, in-sequence delivery of RLC PDUs to the RLC entity on the network side is required in order to avoid unnecessary detection of losses and retransmissions on the RLC level.

The operation of reordering function is determined by two major parameters, which are for the purpose of this report termed as Receiver Window and Reordering Release Timer, as illustrated in the FIG. 8. The Receiver window sets up an upper bound for acceptable maximum data rate on the uplink. Whenever a PDU with TSN being larger than current upper edge of the window enters reordering buffer, Receiver Window is moved in the direction of increasingly larger TSNs and the PDUs remaining out of it are immediately forwarded to the RLC receiving entity. The window is also moved in the same direction after expiry of the Reordering Release timer thus allowing for detection of gaps by RLC receiving entity.

The details of the reordering function have not yet been standardized, but it is all probability that the two major parameters will be subject to semi-static configuration by S-RNC (legacy architecture).

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset".

The "Node B controlled TFC subset" is a subset of the TFCS configured by RNC as seen in FIG. 7. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling Grant (SG) may be transmitted in the downlink from a Node B to a user equipment. Upon receiving the scheduling request the Node B may schedule a user equipment based on the scheduling information (SI) and parameters like available RoT margin at the Node B. In the Scheduling Grant (SG) the Node B may signal the TFCS indicator and subsequent transmission start time and validity period to be used by the user equipment.

The usage of either rate or time and rate scheduling is of course restricted by the available power, as the E-DCH will have to co-exist with a mix of other transmissions by that UE and other UEs in the uplink. The co-existence of the different scheduling modes may provide flexibility in serving different traffic types. For example, the applications demanding lower data rates may be sent over E-DCH in rate controlled mode while the applications demanding higher data rate may be sent over E-DCH in time and rate controlled mode.

Serving Node B and its Role in Node B Controlled Scheduling

The following section will briefly summarize the scheduling operation from a radio interface Layer-2 perspective. The Node B controlled scheduling is based on uplink and downlink control together with a set of rules on how the UE behaves with respect to this signaling. On the downlink, a resource indication (scheduling grant) is required to indicate to the UE the maximum amount of uplink resources it may use.

Node B Controlled Scheduling for Guaranteed Bit-rate Traffic

Guaranteed Bit-rate traffic is supported by allowing non-scheduled and scheduled data transmissions.

For non-scheduled data transmissions a guaranteed bit-rate for a MAC-d flow or logical channel may be supported. Non-scheduled transmissions mean that there can be autonomous transmissions without a scheduler in the Node B granting the transmissions. Generally, the S-RNC decides on whether traffic is transmitted in a non-scheduled mode and reports this decision to a respective UE and to the Node-Bs in communication with the UE. The respective Node-Bs should reserve sufficient amount of resources based on statistical multiplexing gains for non-scheduled data transmissions. The mechanism can be used e.g. for Guaranteed Bit-rate delay-sensitive applications such as voice and/or for signaling radio bearers.

For scheduled data transmissions, a guaranteed bit-rate for a UE is supported. The respective guaranteed bit-rate value is provided by the S-RNC to a Node B, and the scheduler shall act upon it this configuration parameter. The mechanism can be advantageously used e.g. for Guaranteed Bit-rate non-delay-sensitive applications such as streaming.

Scheduling Grants

Scheduling grants can be sent once per TTI or slower. There are two types of grants: absolute grants and relative grants. The absolute grants provide an absolute limitation of the maximum amount of UL resources the UE may use. The relative grants increase or decrease the resource limitation compared to the previously used value.

When considering soft handover (SHO) operation of E-DCH, serving and non-serving Node Bs may be defined. The serving Node B may be defined as the Node B controlling the serving cell of the UE in soft handover. It is important to note that absolute grants may be sent by serving Node B only, while relative grants may be sent by both a serving and non-serving Node B. The cell through which a UE receives absolute grants is referred to the serving cell. Further, the Node B controlling the serving cell is referred to as the serving Node B or S-Node B.

As indicated above, absolute scheduling grants are sent through the serving cell and are valid for one UE, for a group of UEs or for all UEs. Further, the absolute grants may have an associated duration of validity.

Relative scheduling grants (updates) are sent by the serving and non-serving Node-Bs as a complement to absolute grants. The relative grant from the serving Node-B can take one of the three values: "UP", "HOLD" or "DOWN". Further, relative grants from the non-serving Node-B can take one of the two values: "HOLD" or "DOWN". The "DOWN" command corresponds to an "overload indicator".

The UE behavior is defined by the way in which absolute/relative grants are processed in the mobile terminal. One exemplary operation of a UE receiving scheduling grants may be as follows.

The UE maintains a "serving Node-B grant", which corresponds to the last absolute grant received from the E-DCH serving cell which has then been modified, every TTI, by serving Node-B relative grants. This operation is independent of the relative grants received from the non-serving Node-Bs. If at least one non-serving Node-B indicates "DOWN", the UE may degrade the current used bit-rate by a pre-defined offset. The offset may be dependant on the bit-rate.

The calculation of the pre-defined offset is implementation dependent. E.g. the offset may be function of the measured CPICH power on the overloaded cells in relation to the measured CPICH power on the serving cell.

When no more "DOWN" is received from any non-serving Node-Bs the UEs gradually increases its current bit-rate, by another pre-defined offset until it reaches maintained "serving Node-B grant". The offset may be dependant on the bit-rate. Once the "serving Node-B grant" has been reached, and as long as no "DOWN" is received from any non-serving Node-Bs, the UE follows serving Node-B.

The common denominator for the present and other considered UE behaviours is that the upper-most limit for uplink data rate by the UE is set by serving Node B and that the upper limit can be temporarily constrained by non-serving Node Bs. As in UMTS Release 99 also for E-DCH in Release 6, a gain factor denoting the power offset from the DPCCH is calculated by a UE or is explicitly signaled from the UTRAN for each TFC (transport format combination) used for uplink data transmission.

Currently there is a so-called "boosted mode" and "nominal mode" under discussion within 3GPP. The "boosted mode" should be used for the transmission of very delay critical data. The transmission boost is achieved by some additional gain factor (power offset) for the uplink data transmission. The gain factor for "nominal" mode is the calculated or explicitly signalled gain factor for "boosted" mode as described before. It is clear that UEs in "boosted" mode contribute more significantly to the rise over thermal (RoT) than UEs in nominal mode.

When considering the current scheme, it is obvious that the influence of said temporary limitation upon guaranteed bit-rate traffic depends on active set Update criteria, UE mode with respect to gain factors (boosted, nominal) and settings for said offsets. active set Update Criteria are a matter of network implementation and are not expected to contribute resolutely to differentiation of UEs. On the other side, the UE gain factor and offset settings (which may depend on the required bit-rate) may be significantly different amongst various UEs thus implying that aggregated measurements for a cell convey insufficient amount of information. Therefore in certain scenarios dedicated measurements are clearly advantageous when compared against common (aggregated) Layer-2 measurements.

Definition of the Costly UEs

Each of the TFs used for uplink transmissions on the E-DCH may be associated to certain amount of the noise rise in the Node Bs in the active set. Therefore, each UE may be associated to a certain cost factor which reflects the noise rise caused by the UE within the cell.

An exemplary mapping between TFs in the TF set of the UE may be found in the table below.

| TFC | Cost |
|---|---|
| 0 | 1 |
| 1 | 2 |
| 2 | 5 |
| 3 | 5 |
| 4 | 6 |
| 5 | 8 |
| 6 | 10 |

It should be noted that the gain factors of the UEs contribute to the cost of UEs as well.

Functionality Split for E-DCH

When transmitting uplink data via an E-DCH, the data channel is commonly terminated in the S-RNC. However, especially in a soft handover scenario of a mobile terminal the uplink data may be provided from the UE via a Node B and a C-RNC to the S-RNC. In this case the following functional split of network elements may be provided. The C-RNC may be defined as a network element having ownership over resources of Radio Network Subsystem (RNS), while S-RNC may be defined as a network element terminating user-specific functions (e.g. reordering) on the Radio Access Network side.

|  | Node B | C-RNC | S-RNC |
|---|---|---|---|
| Admission Control |  | X |  |
| Congestion Control | X | X |  |
| Reordering |  |  | X |
| Scheduling | X |  |  |
| Cell Specific uplink resource control |  | X |  |

The purpose of the admission control is to admit or deny new users, new radio access bearers or new radio links (for example due to handover). The admission control should try to avoid overload situations and base its decisions on interference and resource measurements. The admission control is employed at for example initial UE access, RAB assignment/reconfiguration and at handover. These cases may give different answers depending on priority and situation.

Commonly, the Admission Control function based on uplink interference and downlink power is located in the Controlling RNC. The Serving RNC is performing admission control towards the Iu interface.

The task of congestion control is to monitor, detect and handle situations when the system is reaching a near overload or an overload situation with the already connected users. This means that some part of the network has run out, or will soon run out of resources. The congestion control should then bring the system back to a stable state as seamless as possible.

The scheduling and reordering functionality provided by UMTS have been discussed above.

E-DCH Configuration

Cell-Level E-DCH Configuration

Presently the E-DCH may be configured with respect to "Total power available for E-DCH" when the Node B schedules UEs in the cell so that the measured total E-DCH power does not exceed the signaled Total Power for E-DCH. Secondly, an E-DCH may be configured with respect to "Target/Limit of Total UL power" when the Node B schedules the E-DCH UEs in the cell so that the measured total UL power does not exceed the signaled Target of the Total UL power. Finally, E-DCH may be configured with "Target/Limit of Total UL power" with respect to "Total power available for E-DCH" which is a combination of the previous two ways of configuration.

For each of the three ways of cell level configuration, an E-DCH may be configured per MAC-d flow as described in e.g. in the copending European patent application no. EP 04 023 418.9.

An exemplary transport channel protocol model for E-DCH without Iur mobility is shown in the FIG. 9. It is still unclear whether the E-DCH frame protocol (FP) is terminated in the C-RNC or S-RNC in the case of Iur mobility. An exemplary transport channel protocol model for E-DCH assuming Iur mobility is shown in the FIG. 10. For uplink transmission without Iur mobility (i.e. S-RNC and C-RNC are coincident) the provided bit-rate (per Node B or after macro diversity combining) may be measured in the RNC.

However, in the case of Iur mobility (i.e. S-RNC and C-RNC are not coincident), it is not possible to measure the provided bit-rate for individual uplink transmissions on the E-DCH in the C-RNC, if E-DCH FP is not terminated in the C-RNC as illustrated in the FIG. 10. If E-DCH FP was terminated in the C-RNC, it would be possible to measure a provided bit-rate per Node B but not a provided bit-rate after micro diversity combining.

QoS Classes and Attributes

The nature of the information to be transmitted has a strong influence on the way this information should be transmitted. For instance, a voice call has completely different characteristics than a browsing session (internet). In general, applications and services can be divided into different groups, depending on how they are considered. Four different classes of services have been identified in UMTS and the table below lists their respective characteristics and foreseen use cases.

| | Traffic class | | | |
|---|---|---|---|---|
| | Conversational class conversational RT | Streaming class streaming RT | Interactive class Interactive best effort | Background Background best effort |
| Fundamental characteristics | Preserve time relation (variation) between information entities of the stream Conversational pattern (stringent and low delay) | Preserve time relation (variation) between information entities of the stream | Request response pattern Preserve payload content | Destination is not expecting the data within a certain time Preserve payload content |
| Example of the application | voice | streaming video | Web browsing | background download of emails |

For each of these traffic classes, a list of QoS attributes can be defined as shown in the following table. If the QoS attributes are met, it is ensured that the message is perceived by the end user with the required quality. The QoS attributes are negotiated between the different elements of the communication chain (UE, RNC, CN elements) during the setup of a connection and depend on the type of service requested and the capabilities of the different nodes. If one of the QoS attributes is not met, the end user will certainly remark a degradation of the communication (e.g. voice deformation, connection blank, etc).

| | Traffic class | | | |
|---|---|---|---|---|
| | Conversational class | Streaming class | Interactive class | Background class |
| Maximum bitrate | X | X | X | X |
| Delivery order | X | X | X | X |
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit-rate | X | X | | |
| Traffic handling priority | | | X | |
| Allocation/ Retention priority | X | X | X | X |
| Source statistics descriptor | X | X | | |
| Signalling Indication | | | X | |

During a Radio Access Bearer (RAB) assignment procedure, the RNC receives the parameters of the RAB to be established and in particular its QoS attributes. The CN initiates the procedure by sending a RAB ASSIGNMENT REQUEST message to the RNC. The message contains the IE "RAB Parameters", which comprises all necessary parameters for RABs including QoS attributes.

Upon reception of the RAB ASSIGNMENT REQUEST message, the UTRAN executes the requested RAB configuration. The CN may indicate that RAB QoS negotiation is allowed for certain RAB parameters and in some cases also which alternative values to be used in the negotiation.

The general idea behind the RAB QoS negotiation is to provide a solution in case a user is asking for a service with specified QoS requirements, but for some reasons (e.g. resources are not available) the system cannot meet the requirements precisely. In such situation a negotiation of certain RAB parameters (QoS attributes) like guaranteed bit-rate or maximum bit-rate is allowed by the CN in order to provide the user at least a connection with compromised QoS attributes instead of leaving the user without service. RAB establishment and QoS negotiation are types of Iu admission control that is carried out in the C-RNC.

The admission control mentioned in the section with respect to the functionality split for E-DCH above refers to the admission control to the Serving Radio Network Subsystem. The resources of the Serving Radio Network Subsystem are thereby controlled by C-RNC. Iu admission control refers to the admission control to the Radio Access Network and is a function of the S-RNC.

As indicated above, in an UMTS radio access network insufficient information is available in the C-RNC for the purpose of admission control and congestion control of scheduled data.

For admission control of scheduled data by C-RNC it is necessary to gather the information in C-RNC from Node B about resource consumption (Layer-1 information) for given level of satisfaction of QoS requirements (Layer-2 information). This Layer-2 information is currently not available in the C-RNC. If already admitted guaranteed bit-rate (GBR) users have satisfactory performance in terms of QoS, an additional user may be admitted.

For congestion control of scheduled data by C-RNC it is necessary to gather the information from Node B about current consumption of resources (Layer-1 information) for given level of satisfaction of QoS requirements (Layer-2 information) as agreed with the S-RNC during call admission control so that these C-RNC may invoke certain actions to honor these requirements.

As a part of congestion control, C-RNC may reconfigure resources assigned to the E-DCH of a particular user (e.g. 'Total Power') or it may wish to pre-empt the traffic over given logical channel/MAC-d flow and switch it to legacy dedicated channel. Same as for admission control, this information is currently not available in the C-RNC.

The main problem is that Layer-2 information is missing in the C-RNC. QoS control for scheduled data cannot be properly exercised without this information.

However, given that High Speed Downlink Packet Access (HSDPA), Multimedia Broadcast Multicast Service (MBMS) and High Speed Uplink Access (HSUPA) will probably be deployed in respective temporal order in radio access network thus imposing additional requirements on transport network capacity and especially on "last mile" connection (i.e. Iub in legacy UTRAN). For example, Iub will not be optimized for multicast transmission (at least in Release 6 framework) meaning that point-to-multipoint MBMS Radio Bearer will be mapped to a multiplicity of Iub transport connections of point-to-point type. Depending on capital expenditure for "last mile" when deploying new features in the access network, larger or lower delays or more or less frequent congestion occurrences on this interface are possible. Therefore, minimizing possible Iub load may serve as a design constraint to the problems as identified above.

SUMMARY OF THE INVENTION

The object of the invention is to enable the controlling radio network controller within a mobile communication system to perform congestion control for uplink transmissions having a guaranteed bit-rate. It is a further object of the invention to reduce the load of the interfaces between Node Bs and RNCs.

The object is solved by the subject matter of the independent claims. Advantageous embodiments of the invention are subject matters to the dependent claims.

One of the main aspects of the invention is to overcome described problems by defining a procedure for sending measurements for scheduled data from at least one Node B to a C-RNC during soft handover operation of the user equipment. Alternatively, the provided bit-rate of at least one Node B connected to the UE may be determined in the S-RNC and may be sent from the S-RNC to C-RNC.

One exemplary embodiment of the invention encompasses a method for providing measurements on a provided bit-rate being provided to scheduled data having a guaranteed bit-rate. The scheduled data is transmitted on a dedicated uplink data channel by a user equipment via a controlling radio network controller in a mobile communication system during soft handover of the user equipment. At least one of Node Bs involved in the soft handover is connected to the controlling radio network controller. Further, individual uplink data transmissions of user equipments in the mobile communication system are each associated to a priority class.

The controlling radio network controller may receive at least one dedicated measurement report indicating the provided bit-rate being provided to scheduled data of at least one guaranteed bit-rate priority class being transmitted on the dedicated uplink data channel by the user equipment. The at least one dedicated measurement report is received from at least one Node B of the user equipment's active set being connected to the controlling radio network controller.

Next, the controlling radio network controller may evaluate whether a respective provided bit-rate being provided to a respective on of the at least one priority class is lower than a guaranteed bit-rate of the respective priority class.

If a respective provided bit-rate to the at least one priority class is lower than a guaranteed bit-rate for the respective priority class, the controlling radio network controller may invoke congestion control for data transmissions of the respective priority class to allow for transmitting the scheduled data of the priority class via the uplink data channel at least at the guaranteed bit-rate or to preempt the transmission of data of the respective priority class on the uplink dedicated transport channel.

In a further embodiment of the invention the at least one Node B connected to the controlling radio network controller is the serving Node B of the user equipment during soft handover. The serving Node B is defined as the Node B controlling the UE's serving cell.

The configuration proposed by this embodiment of the invention may be especially feasible if it may be assumed that the serving Node B is the Node B within the user equipment's active set that will provide the highest uplink bit-rate due to providing the best uplink channel quality.

In a variation of this embodiment the at least one measurement report is received from the serving Node B only, and each of the at least one received dedicated measurement report indicates the provided bit-rate being provided to scheduled data of at least one guaranteed bit-rate priority class transmitted on a dedicated uplink data channel by a respective one of all user equipments for which the serving Node B is the common serving Node B.

According to this variation, the serving Node B may thus be configured to not only report on individual user equipments in soft handover, but also on other user equipments which all share the same serving Node B.

In another variation of this embodiment the at least one measurement report is received from the serving Node B only and each of the received at least one measurement report indicates the provided bit-rate being provided to scheduled data of at least one guaranteed bit-rate priority class transmitted on a dedicated uplink data channel by a respective one of a subset of all user equipments connected to the serving Node B. The subset comprises those user equipments connected to the serving Node B having the scheduling priority indicator associated to a respective priority class higher than a predetermined threshold.

As will be explained in further detail in the following description of the various embodiments of the invention, the scheduling priority indicator may be directly associated to a respective priority class. Thus, this variation allows configuring the serving cell's Node B only to report on a predetermined set of UEs which share a common serving Node B and which may for example use a scheduling priority indicator associated to a guaranteed bit-rate priority class.

A further embodiment of the invention relates to a method for providing measurements on a provided bit-rate being provided to scheduled data having a guaranteed bit-rate. The scheduled data may be transmitted on dedicated uplink data channels by user equipments via a controlling radio network controller in a mobile communication system during soft handover of at least one of the user equipments. At least one of Node Bs involved in the soft handover is connected to the controlling radio network controller. Again, individual uplink data transmissions of the user equipments in the mobile communication system are each associated to a priority class.

According to this embodiment the controlling radio network controller may receive at least one common measurement report indicating at least one provided bit-rate being provided to scheduled data of at least one guaranteed bit-rate priority class transmitted on the dedicated uplink data channels. The at least one common measurement report is received from at least one Node B of the active set of the at least one user equipment being in handover, and the at least one Node B is connected to the controlling radio network controller.

Further, the controlling radio network controller may evaluate whether a respective provided bit-rate being provided to a respective one of the at least one priority class is lower than a guaranteed bit-rate of the respective priority class.

If a respective provided bit-rate to the at least one priority class is lower than a guaranteed bit-rate for the respective priority class, the controlling radio network controller may invoke congestion control for data transmissions of the respective priority class to allow for transmitting the scheduled data of the priority class via the respective uplink data channel at least at the guaranteed bit-rate or to preempt the data of the respective priority class from being transmitted on the respective uplink dedicated transport channel.

In a variation of this embodiment, the at least one common measurement report received from the at least one Node B comprises a list identifying user equipments transmitting scheduled data on the dedicated uplink data channels. This list of user equipments comprises those user equipments using averaged uplink resources above a predetermined threshold for transmitting the scheduled data.

Including the list of "costly" user equipments to the common measurement report may allow the controlling radio network controller to detect radio links of individual user equipments which significantly contribute to the noise rise within a cell of a reporting Node B. If necessary the controlling radio network controller may use the information obtained from this list to for example reconfigure the active set of individual "costly" user equipments in order to enhance the quality of service on the uplink for the other user equipments in the cell.

In a further embodiment of the invention, the at least one dedicated or common measurement report is received from a subset of the Node Bs connected to the radio network controller. For example, for a user equipment being in soft handover, this subset may comprise those Node Bs of the user equipment's active set that are controlled by the controlling radio network controller.

In a variation of this embodiment the controlling radio network controller may signal a dedicated or common measurement request to the selected subset of Node Bs indicating to the selected subset of Node Bs to provide at least one dedicated or common measurement report indicating provided bit-rate being provided to the scheduled data of the at least one priority class.

In a further variation, those Node Bs for which the average reported number of retransmissions for protocol data units conveying the scheduled data of a respective one of the at least one guaranteed bit-rate priority class is lower than a threshold value are selected to be comprised in the subset of Node Bs.

In a further embodiment of the invention the average reported number of retransmissions for a respective one of the at least one priority class is provided within a field of data frame of dedicated uplink transport channel frame protocol.

As indicated above, the frame protocol may be terminated in the serving radio network controller. Therefore, another embodiment of the invention foresees that the controlling radio network controller receives the average reported number of retransmissions for a respective one of the at least one guaranteed bit-rate priority class from the serving radio network controller.

In another embodiment of the invention, the dedicated measurement report is a Dedicated Measurement Report message of the NBAP protocol and the Dedicated or Common Measurement Report message comprises information elements indicating the at least one guaranteed bit-rate priority class of scheduled data and the respective provided bit-rate being provided to scheduled data of a respective one of the at least one guaranteed bit-rate priority class.

In further embodiment of the invention the dedicated or common measurement request is a Dedicated or Common Measurement Initiation Request message of the NBAP protocol and the Dedicated or Common Measurement Initiation Request message comprises the at least one guaranteed bit-rate priority class of the scheduled data a Node B receiving the message has to report on.

Another embodiment relates to the serving radio network controller performing the measurement. According to this embodiment a method for providing measurements on a provided bit-rate being provided to scheduled data having a guaranteed bit-rate and being transmitted on a dedicated uplink data channel by a user equipment via a controlling radio network controller in a mobile communication system is provided. The individual uplink data transmissions of the user equipments in the mobile communication system are each associated to a priority class.

The controlling radio network controller may receive at least one dedicated measurement report indicating the provided bit-rate being provided to scheduled data of at least one guaranteed bit-rate priority class transmitted on the dedicated uplink data channel by the user equipment. The at least one dedicated measurement report is thereby received from a serving radio network controller of the mobile communication network controlling the user equipment and being connected to the controlling radio network controller.

According to this embodiment the controlling radio network controller may evaluate whether a respective provided bit-rate being provided to a respective one of the at least one priority class is lower than a guaranteed bit-rate of the respective priority class.

If a respective provided bit-rate to the at least one priority class is lower than a guaranteed bit-rate for the respective priority class, the controlling radio network controller may invoke congestion control for data transmissions of the respective provided priority class to allow for transmitting the scheduled data of the provided priority class via the dedicated uplink data channel at least at the guaranteed bit-rate or to preempt the transmission of data of the respective priority class on the uplink dedicated transport channel.

In a variation of this embodiment the at least one dedicated measurement report received from the serving radio network controller reports on the provided bit-rate being provided to scheduled data of the at least one guaranteed bit-rate priority class by a respective one of a subset of the Node Bs within the active set. Thereby the Node Bs of the subset are connected to the controlling radio network controller.

In a further variation of this embodiment the controlling radio network controller may signal a dedicated measurement request to the serving radio network controller indicating to the serving radio network controller to provide the at least one dedicated measurement report indicating the provided bit-rate being provided to the scheduled data of a respective one of the at least one guaranteed bit-rate priority class by a respective one of the subset of the Node Bs.

In another variation, the cells controlled by Node Bs within the mobile communication system are identified by cell identifiers and the dedicated measurement request conveys the cell identifiers of the Node Bs comprised in the subset within an information element.

In a further embodiment of the invention the controlling radio network controller may transmit a dedicated measurement request to the serving radio network controller. This dedicated or common measurement request may comprise an indication of whether to report on the provided bit-rate being provided to a priority class before macro diversity combining of scheduled data at the serving radio network controller or whether to report on the provided bit-rate being provided to the at least one priority class after macro diversity combining of the scheduled data.

Moreover, another embodiment of the invention foresees that the dedicated measurement request is a Dedicated Measurement Initiation Request message of the RNSAP protocol and the Dedicated Measurement Initiation Request message comprises the at least one priority class of scheduled data transmitted on the dedicated uplink data channel the serving radio network controller receiving the message has to report on.

A further embodiment of the invention is related to a method for providing measurements on a provided bit-rate being provided to scheduled data of at least one priority class transmitted on dedicated uplink data channels by user equipments via at least one Node B via a controlling radio network controller in a mobile communication system. Thereby individual uplink data transmissions of the user equipments in the mobile communication system are each associated to a priority class.

The controlling radio network controller may receive common measurement reports, each common measurement report indicating the provided bit-rate being provided to scheduled data of at least one guaranteed bit-rate priority class from a serving radio network controller of the mobile communication network controlling the user equipment and being connected to the controlling radio network controller.

Next, the controlling radio network controller may evaluate whether a respective provided bit-rate being provided to a respective one of the at least one priority class is lower than a guaranteed bit-rate for the respective priority class, and if a respective provided bit-rate to the at least one priority class is lower than a guaranteed bit-rate for the respective priority class, it may invoke congestion control for data transmissions of the respective provided priority class to allow for transmitting the scheduled data of the priority class via the dedicated uplink data channels at least at the guaranteed bit-rate or to preempt the transmission of data of the priority class on the uplink dedicated transport channel for at least one of the user equipments.

In a further embodiment, the controlling radio network controller may further select a subset of the at least one Node B connected to the controlling radio network controller, and may signal a common measurement request to the serving radio network controller indicating to the serving radio network controller to provide at least one common measurement report indicating the provided bit-rate being provided to scheduled data of a respective on of the at least one guaranteed bit-rate priority class by a respective one of the subset of the Node Bs. The common measurement request may configure the Node Bs in the subset to provide the common measurement reports.

In a variation of this embodiment the cells controlled by Node Bs within the mobile communication system are identified by cell identifiers and the common measurement request conveys the cell identifiers of the Node Bs comprised in the subset within an information element to identify the Node Bs in the subset.

In a further embodiment the common measurement request is a Common Measurement Initiation Request message of the RNSAP protocol and the Common Measurement Request message comprises the at least one priority class the serving radio network controller has to report on.

Another embodiment of the invention foresees that the at least one common measurement report received from the serving radio network controller comprises a list identifying user equipments transmitting scheduled data on the dedicated uplink data channels. As explained previously, the list comprises those user equipments using averaged uplink resources above a predetermined threshold for transmitting the scheduled data.

In another embodiment of the invention the controlling radio network controller may admit new user equipments requesting to provide uplink data transmissions of the priority class to connect to a Node B that has previously been reported on for having a provided bit-rate lower than the guaranteed bit-rate for the priority class, if it is indicated in a subsequent measurement report for the Node B that the provided bit-rate for the priority class is at least equal to the guaranteed bit-rate for uplink data traffic of the priority class at the Node B.

The following exemplary embodiments deal with the actions performed by the controlling radio network controller when initiating congestion control.

For example, in case the maximum rise over thermal resources that can be allocated to a Node B for providing data of the guaranteed bit-rate priority class are not sufficient to provide the data of the priority class at the guaranteed bit-rate and in case a measurement report has been previously provided indicating that the provided bit-rate being provided to the data transmissions of the priority class by the Node B is lower than the guaranteed bit-rate, the controlling radio network controller may transmit a radio link preemption request from the controlling radio network controller to the serving radio network controller requesting the preemption of the MAC-d flow associated to the priority class at the user equipment.

In another embodiment, and in case the maximum rise over thermal resources that can be allocated to a Node B for providing data of the priority class are sufficient to provide the data of the priority class via the dedicated uplink data channel at the guaranteed bit-rate and in case a measurement report has been previously provided indicating that the provided bit-rate being provided to the data transmissions of the priority class by the Node B is lower than the guaranteed bit-rate, controlling radio network controller may transmit a radio link congestion indication message from the controlling radio network controller to the serving radio network controller. The radio link congestion indication may thereby indicate the MAC-d flow associated to the priority class for which the provided bit-rate being provided to the priority class is lower than the guaranteed bit-rate for the priority class.

Further embodiments of the invention relate to the serving radio network controller and its operation. According to one of these embodiments, a method for initiating congestion control for scheduled data transmissions of a priority class on an uplink dedicated channel in response to measurements on a provided bit-rate being provided to data transmissions of the priority class on the uplink data channel in a mobile communication system is provided. The uplink data transmissions of user equipments in the mobile communication system are each associated to a priority class.

The serving radio network controller may receive from at least one Node B of at least one user equipment's active set scheduled data of a guaranteed bit-rate priority class having been transmitted by at least one user equipment on the uplink dedicated data channel.

Further, it may determine the provided bit-rate being provided to the scheduled data of the guaranteed bit-rate priority class from the at least one Node B or the bit-rate provided to the scheduled data of the guaranteed bit-rate priority class after performing macro diversity combining of the scheduled data of the priority class at the serving radio network controller and may transmit to the controlling radio network controller at least one dedicated measurement report indicating the provided bit-rate being provided to scheduled data of the guaranteed bit-rate priority class.

The serving radio network controller may further receive a congestion indication from the controlling radio network controller indicating a guaranteed bit-rate priority class of scheduled data transmitted by the at least one user equipment for which the provided bit-rate is lower than a guaranteed bit-rate, and may perform congestion control for the indicated guaranteed bit-rate priority class.

Another embodiment of the invention provides a method for initiating congestion control for scheduled data transmissions of a priority class of user equipments on at least one dedicated uplink data channel in response to measurements on a provided bit-rate being provided to data transmissions of the priority class on the at least one uplink data channel in a mobile communication system. Again, uplink data transmissions of the user equipments in the mobile communication system are each associated to a priority class.

In this embodiment the serving radio network controller may receive from at least one Node B scheduled data of a guaranteed bit-rate priority class having been transmitted by at least one of the user equipments connected to a respective one of the at least one Node B on a respective one of the at least one dedicated uplink data channels.

The serving radio network controller may determine the provided bit-rate being provided to the scheduled data of the guaranteed bit-rate priority class from the at least one Node B or the bit-rate provided to the scheduled data of the guaranteed bit-rate priority class after performing macro diversity combining of the scheduled data at the serving radio network controller and may transmit to the controlling radio network controller at least one common measurement report indicating the provided bit-rate being provided to scheduled data of the guaranteed bit-rate priority class.

Upon receiving a congestion indication from the controlling radio network controller indicating a guaranteed bit-rate priority class of scheduled data for which the provided bit-rate is lower than a guaranteed bit-rate, the serving radio network controller may perform congestion control for the indicated guaranteed bit-rate priority class.

In a variation of this embodiment the serving radio network controller may form a list identifying user equipments transmitting scheduled data of the guaranteed bit-rate priority class on the dedicated uplink data channels, wherein the list comprises those user equipments using averaged uplink resources above a predetermined threshold for transmitting the scheduled data, and may include the list of user equipments to the at least one common measurement report transmitted to the controlling radio network controller.

Another embodiment of the invention foresees that the congestion indication requests the preemption of a MAC-d flow associated to the guaranteed bit-rate priority class, and the serving radio network controller transmits a MAC-d flow preemption message indicating to the controlling radio network controller to preempt resources for the transmission of the MAC-d flow being associated to the guaranteed bit-rate priority class for at least one user equipment transmitting scheduled data of the guaranteed bit-rate priority class.

In another embodiment of the invention the serving radio network controller may further receive a dedicated or common measurement request comprising an indication to the serving radio network controller whether to report on the bit-rate provided to a priority class before macro diversity combining of the scheduled data or whether to report on the bit-rate provided to scheduled data of a priority class after macro diversity combining of the scheduled data at the serving radio network controller.

Accordingly, the at least one dedicated or common measurement report transmitted to the controlling radio network controller indicates the provided bit-rate being provided to the priority class after macro diversity combining or before macro diversity combining in accordance with the indication provided in the dedicated or common measurement request.

In one embodiment of the invention, the congestion indication is a radio link congestion indication message indicating a MAC-d flow associated to a respective priority class for which congestion control is to be performed. In this embodiment the serving radio network controller may reconfigure the serving radio network controller controlled transport format combination to allow for providing the scheduled data of the priority class at least at the guaranteed bit-rate, if the serving radio network controller controlled transport format combination set does not provide sufficiently high bit-rate to allow for providing the scheduled data of the priority class at least at the guaranteed bit-rate.

Further, it may transmit a radio link reconfiguration request message to the indicated Node B. The radio link reconfiguration request message may reconfigure the Node B controlled transport format combination set of the indicated Node B to allow for providing the scheduled data of the priority class at least at the guaranteed bit-rate.

In another embodiment of the invention, at least one of the priority classes associated to uplink data transmissions of user equipments is allocated to at least one non-scheduled data transmission of the user equipment on the dedicated uplink data channel.

In a variation of this embodiment, the serving radio network controller may transmit an indication whether congestion control is to be performed for at least one of the priority classes associated to non-scheduled data transmitted on the dedicated uplink data channel over a frame protocol or NBAP protocol.

In another embodiment of the invention, the dedicated uplink data channel is an Enhanced Dedicated Uplink Channel E-DCH and the mobile communication system is a UMTS system.

A further embodiment of the invention provides a controlling radio network controller in a mobile communication system evaluating measurements on a provided bit-rate being provided to scheduled data having a guaranteed bit-rate and being transmitted on a dedicated uplink data channel by a user equipment via the controlling radio network controller during soft handover of the user equipment. At least one of Node Bs involved in the soft handover is connected to the controlling radio network controller. Moreover, individual uplink data transmissions of user equipments in the mobile communication system are each associated to a priority class.

The controlling radio network controller may comprise communication means for receiving at least one dedicated measurement report indicating the provided bit-rate being provided to scheduled data of at least one guaranteed bit-rate priority class being transmitted on the dedicated uplink data channel by the user equipment. The communication means may be adapted to receive the at least one dedicated measurement report from at least one Node B of the user equipment's active set being connected to the controlling radio network controller.

Moreover, the controlling radio network controller may comprise a processing means for evaluating whether a respective provided bit-rate being provided to a respective on of the at least one priority class is lower than a guaranteed bit-rate of the respective priority class, wherein the processing means being adapted to invoke congestion control for data transmissions of the respective priority class to allow for transmitting the scheduled data of the priority class via the uplink data channel at least at the guaranteed bit-rate or to preempt the transmission of data of the respective priority class on the uplink dedicated transport channel, if a respective provided bit-rate to the at least one priority class is lower than a guaranteed bit-rate for the respective priority class.

In a variation of this embodiment, the controlling radio network controller may further comprise means adapted to perform the steps of method for providing measurements on a provided bit-rate being provided to scheduled data having a guaranteed bit-rate according to one of the various embodiments of the invention and their variations described above.

Another embodiment provides controlling radio network controller in a mobile communication system evaluating measurements on a provided bit-rate being provided to scheduled data having a guaranteed bit-rate and being transmitted on dedicated uplink data channels by user equipments via the controlling radio network controller during soft handover of at least one of the user equipments. At least one of Node Bs involved in the soft handover being connected to the controlling radio network controller and individual uplink data transmissions of the user equipments in the mobile communication system are each associated to a priority class.

The controlling radio network controller may comprise a communication means for receiving at least one common measurement report indicating at least one provided bit-rate being provided to scheduled data of at least one guaranteed bit-rate priority class transmitted on the dedicated uplink data channels, wherein the communication means is adapted to receive the at least one common measurement report from at least one Node B of the user equipment's active set being connected to the controlling radio network controller.

The controlling radio network controller may also comprise a processing means for evaluating whether a respective provided bit-rate being provided to a respective one of the at least one priority class is lower than a guaranteed bit-rate of the respective priority class. The processing means may be adapted to invoke congestion control for data transmissions of the respective priority class to allow for transmitting the scheduled data of the priority class via the respective uplink data channel at least at the guaranteed bit-rate or to preempt the data of the respective priority class from being transmitted on the respective uplink dedicated transport channel, if a respective provided bit-rate to the at least one priority class is lower than a guaranteed bit-rate for the respective priority class.

In a variation of this exemplary embodiment, the controlling radio network controller may further comprise means adapted to perform the steps of method for providing measurements on a provided bit-rate being provided to scheduled data having a guaranteed bit-rate according to one of the various embodiments of the invention and their variations described above.

In a variation of this embodiment, the controlling radio network controller may further comprise means adapted to perform the steps of method for providing measurements on a provided bit-rate being provided to scheduled data having a guaranteed bit-rate according to one of the various embodiments of the invention and their variations described above.

Another embodiment relates to a controlling radio network controller in a mobile communication system evaluating measurements on a provided bit-rate being provided to scheduled data having a guaranteed bit-rate and being transmitted on a dedicated uplink data channel by a user equipment via the controlling radio network controller, wherein individual uplink data transmissions of the user equipments in the mobile communication system are each associated to a priority class.

In this embodiment of the invention the controlling radio network controller comprises a communication means for receiving at least one dedicated measurement report indicating the provided bit-rate being provided to scheduled data of at least one guaranteed bit-rate priority class transmitted on the dedicated uplink data channel by the user equipment. The communication means may be adapted to receive the at least one dedicated measurement report from a serving radio network controller of the mobile communication network controlling the user equipment and being connected to the controlling radio network controller.

Further the controlling radio network controller comprises a processing means for evaluating whether a respective provided bit-rate being provided to a respective one of the at least one priority class is lower than a guaranteed bit-rate of the respective priority class, wherein the processing means is adapted to invoke congestion control for data transmissions of the respective provided priority class to allow for transmitting the scheduled data of the provided priority class via the dedicated uplink data channel at least at the guaranteed bit-rate or to preempt the transmission of data of the respective priority class on the uplink dedicated transport channel, if a respective provided bit-rate to the at least one priority class is lower than a guaranteed bit-rate for the respective priority class.

In a variation of this embodiment, the controlling radio network controller may further comprise means adapted to perform the steps of method for providing measurements on a provided bit-rate being provided to scheduled data having a guaranteed bit-rate according to one of the various embodiments of the invention and their variations described above.

According to a further embodiment of the invention a controlling radio network controller in a mobile communication system evaluating measurements on a provided bit-rate being provided to scheduled data of at least one priority class transmitted on dedicated uplink data channels by user equipments via at least one Node B via the controlling radio network controller, wherein individual uplink data transmissions of the user equipments in the mobile communication system are each associated to a priority class.

This controlling radio network controller may comprise a communication means for receiving common measurement reports, each common measurement report indicating the provided bit-rate being provided to scheduled data of at least one guaranteed bit-rate priority class, wherein the communication means may be adapted to receive the at least one common measurement report from a serving radio network controller of the mobile communication network controlling the user equipment and being connected to the controlling radio network controller.

Further, the controlling radio network controller may comprise a processing means for evaluating whether a respective provided bit-rate being provided to a respective one of the at least one priority class is lower than a guaranteed bit-rate for the respective priority class. Thereby the processing means may adapted to invoke congestion control for data transmissions of the respective provided priority class to allow for transmitting the scheduled data of the priority class via the dedicated uplink data channels at least at the guaranteed bit-rate or to preempt the transmission of data of the priority class on the uplink dedicated transport channel for at least one of the user equipments, if a respective provided bit-rate to the at least one priority class is lower than a guaranteed bit-rate for the respective priority class.

In a variation of this embodiment, the controlling radio network controller may further comprise means adapted to perform the steps of method for providing measurements on a provided bit-rate being provided to scheduled data having a guaranteed bit-rate according to one of the various embodiments of the invention and their variations described above.

Another embodiment of the invention relates to a serving radio network controller initiating congestion control for scheduled data transmissions of a priority class on an uplink dedicated channel in response to measurements on a provided bit-rate being provided to data transmissions of the priority class on the uplink data channel in a mobile communication system. Again data transmissions of user equipments in the mobile communication system are each associated to a priority class.

The serving radio network controller according to this embodiment may comprise communication means for receiving from at least one Node B of at least one user equipment's active set scheduled data of a guaranteed bit-rate priority class having been transmitted by at least one user equipment on the uplink dedicated data channel, and processing means for determining the provided bit-rate being provided to the scheduled data of the guaranteed bit-rate priority class from the at least one Node B or the bit-rate provided to the scheduled data of the guaranteed bit-rate priority class after performing macro diversity combining of the scheduled data of the priority class at the serving radio network controller.

The communication means may be adapted to transmit to the controlling radio network controller at least one dedicated measurement report indicating the provided bit-rate being provided to scheduled data of the guaranteed bit-rate priority class, and to receive a congestion indication from the controlling radio network controller indicating a guaranteed bit-rate priority class of scheduled data transmitted by the at least one user equipment for which the provided bit-rate is lower than a guaranteed bit-rate.

Further, the processing means may be adapted to perform congestion control for the indicated guaranteed bit-rate priority class.

In a variation of this embodiment, the serving radio network controller may further comprise means adapted to perform the steps of method for initiating congestion control according to one of the various embodiments of the invention and their variations described above.

An alternative embodiment of the invention foresees a serving radio network controller initiating congestion control for scheduled data transmissions of a priority class of user equipments on at least one dedicated uplink data channel in response to measurements on a provided bit-rate being provided to data transmissions of the priority class on the at least one uplink data channel in a mobile communication system, wherein uplink data transmissions of the user equipments in the mobile communication system are each associated to a priority class.

The serving radio network controller may comprise communication means for receiving from at least one Node B scheduled data of a guaranteed bit-rate priority class having been transmitted by at least one of the user equipments connected to a respective one of the at least one Node B on a respective on of the at least one dedicated uplink data channels, and processing means for determining the provided bit-rate being provided to the scheduled data of the guaranteed bit-rate priority class from the at least one Node B or the bit-rate provided to the scheduled data of the guaranteed bit-rate priority class after performing macro diversity combining of the scheduled data at the serving radio network controller.

The communication means may be adapted to transmit to the controlling radio network controller at least one common measurement report indicating the provided bit-rate being provided to scheduled data of the guaranteed bit-rate priority class, and to receive a congestion indication from the controlling radio network controller indicating a guaranteed bit-rate priority class of scheduled data for which the provided bit-rate is lower than a guaranteed bit-rate.

Further the processing means may be adapted to perform congestion control for the indicated guaranteed bit-rate priority class.

In a variation of this embodiment, the serving radio network controller may further comprise means adapted to perform the steps of method for initiating congestion control according to one of the various embodiments of the invention and their variations described above.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
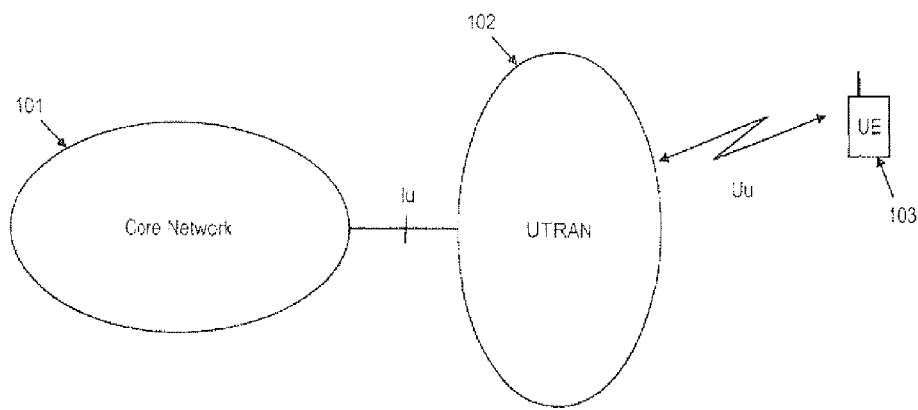
FIG. 1 shows the high-level architecture of UMTS.
Figure 2:
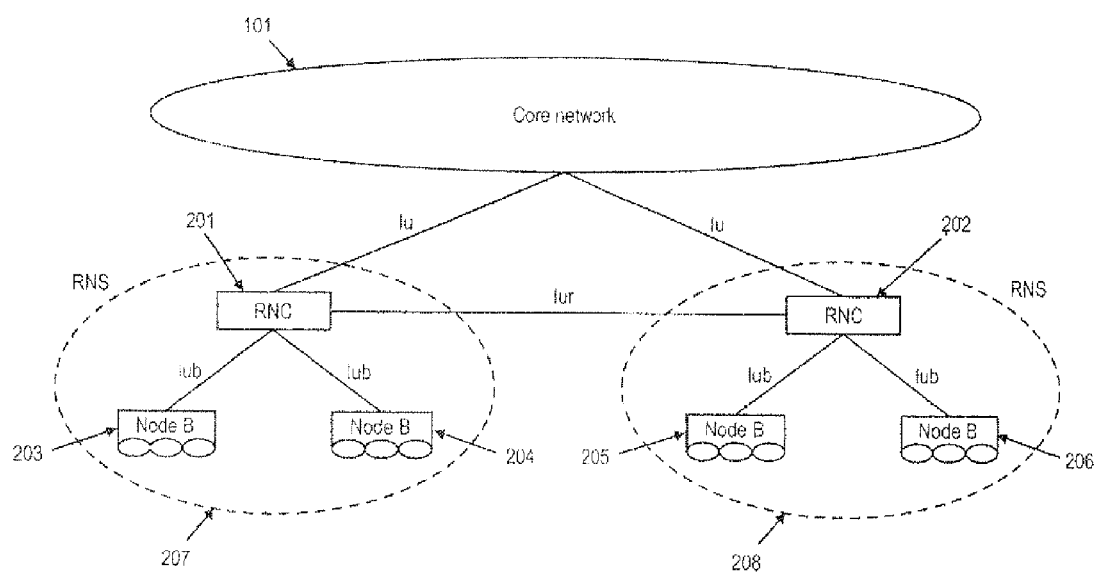
FIG. 2 shows the architecture of the UTRAN according to UMTS R99/4/5.
Figure 3:
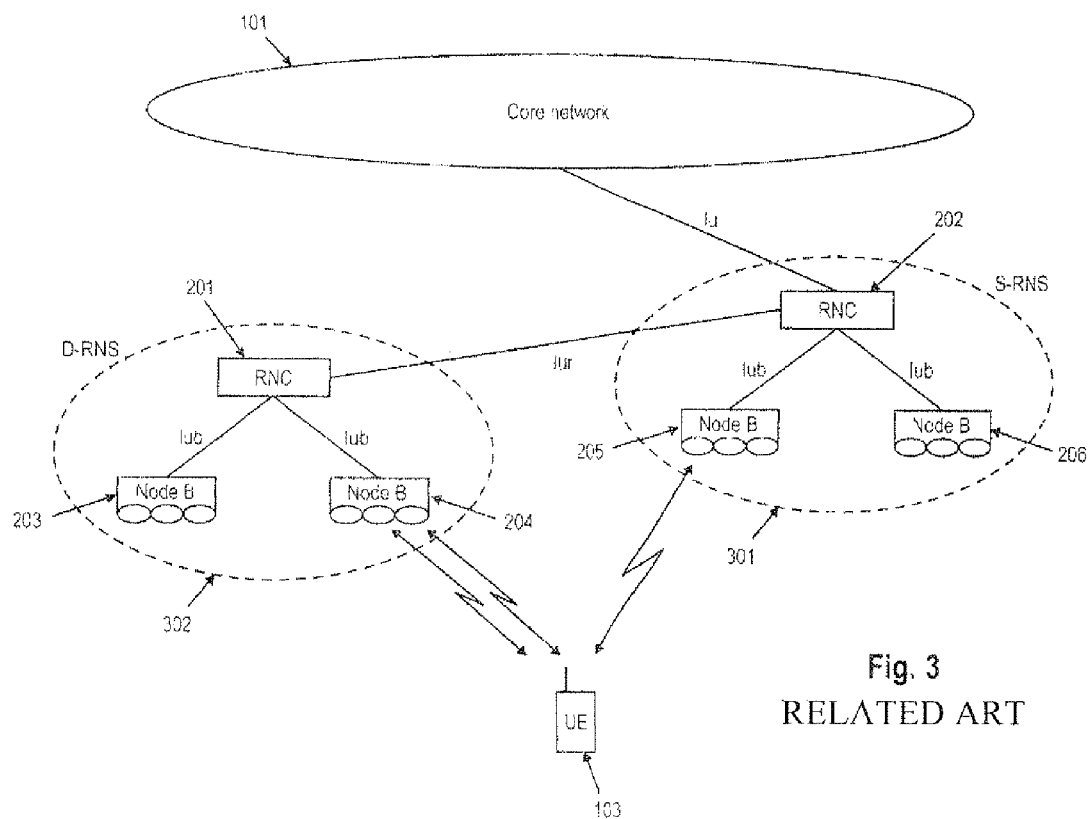
FIG. 3 shows a Drift and a Serving Radio Subsystem.
Figure 4:
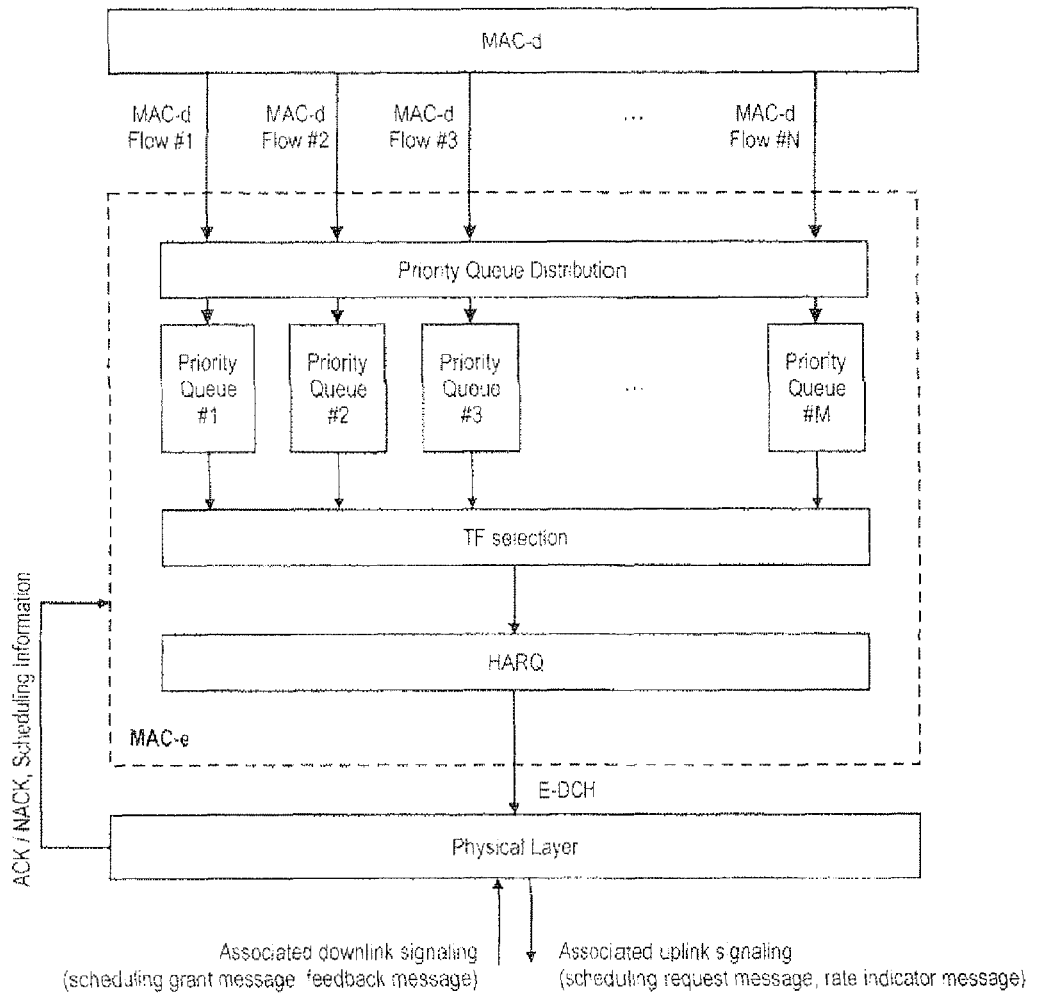
FIG. 4 shows the MAC-e architecture at a user equipment.
Figure 5:
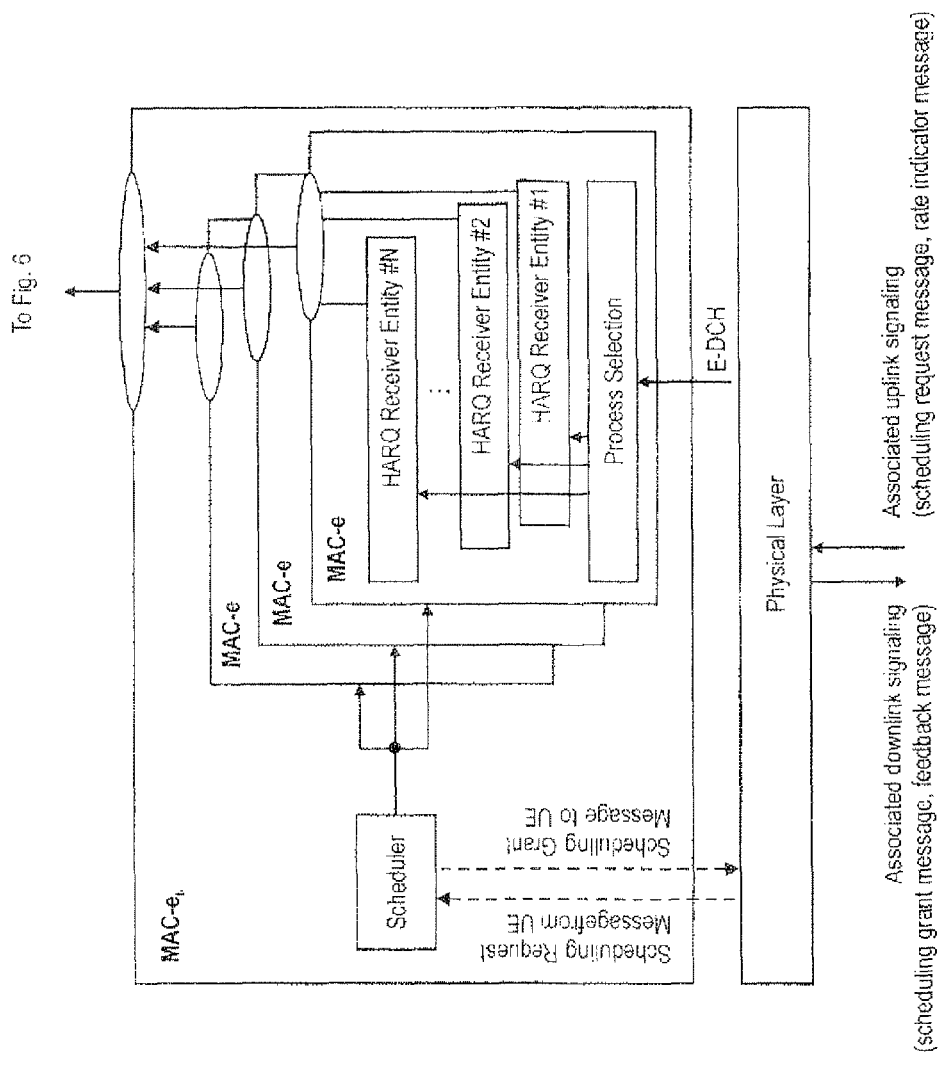
FIG. 5 shows the MAC-$e_b$ architecture at a Node B.
Figure 6:
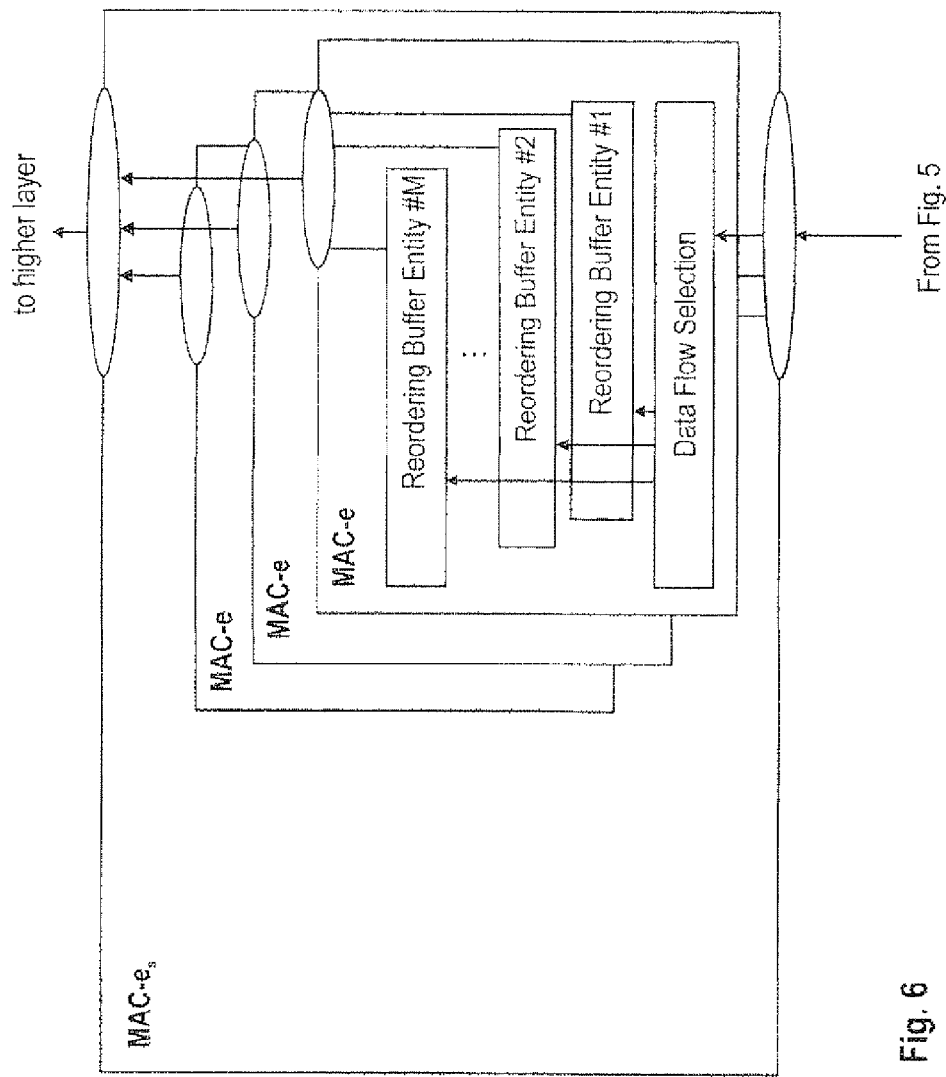
FIG. 6 shows the MAC-$e_s$ architecture at a RNC.

The following paragraphs will describe various embodiments of the invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

The following paragraphs will first outline different terms frequently used herein. A traffic class is a QoS attribute signalled to the S-RNC in the RANAP messaging. It can take any value from the set of {interactive, background, streaming, conversational}. Please note that the elements in the set are ordered in the increasing order following more and more stringent timing requirements.

A logical channel is defined as a service provided to the upper (sub) layers by the MAC sublayer. Logical channels may be multiplexed by the MAC-d entity onto MAC-d flows. Thereby there may be a relation "one to many" between MAC-d flows and logical channels. In the context of this description, a MAC-d flow is sometimes also referred to as a data flow.

Since reordering per logical channel is commonly provided there is essentially one-to-one correspondence between logical channel priorities (MLPs) per logical channel and a scheduling priority indicator (SPI) per priority queue.

That means that a priority class according to this invention refers to a scheduling priority indicator. A scheduling priority indicator is an input parameter for the scheduling function of a Node B. It defines the individual priority of the priority classes to be scheduled by the scheduling function of the Node B. Thus, as will become apparent, the invention allows to measure provided bit-rates on a priority class level and may perform congestion control per priority class of a predetermined priority, i.e. having a predetermined scheduling priority indicator or priority class, and having a guaranteed bit-rate.

One aspect of the invention is to provide sufficient information for QoS control of guaranteed bit-rate scheduled data in the way that also optimizes the utilization of Iub resources. This information may be used for admission control and congestion control in the C-RNC.

According to one embodiment of this invention, procedures for sending measurements for scheduled data from Node B to C-RNC during soft handover E-DCH operation are provided. Node Bs sending a measurement report for a UE may be subset of Node Bs within active set or Serving Node B for the UE. Alternatively, the provided bit-rate by each Node B for an individual UE may be determined in S-RNC and sent from S-RNC to C-RNC.

In another embodiment the S-RNC may measure the provided bit-rate after macro diversity combining (MDC) and send the result to C-RNC.

In different embodiments of the invention the following options for measurement reporting to the C-RNC are foreseen: Measurements transmitted from Node B to C-RNC may be part of common NBAP procedures. In this case they will be of aggregated type. This may mean that reporting is carried out for all scheduled data connections (e.g. MAC-d flows) of users in a certain cell of a certain priority class. Measurements transmitted from Node B to C-RNC may be also a part of dedicated NBAP procedures. This means that reporting is carried out for scheduled data connection (e.g. MAC-d flow) of each user separately. Analogous to the measurements from Node B to C-RNC, measurements from S-RNC to C-RNC may be also a part of common or dedicated RNSAP procedures as will be outlined in the following in more detail.

Another aspect of the invention according to a further embodiment lies on Layer-2 measurements for supporting scheduled data. It is therefore assumed that corresponding Layer-1 measurements may be defined as part of [NBAP] COMMON/DEDICATED MEASUREMENT REPORT message groups without going into further details. These measurements may provide sufficient information on RoT resource utilization.

One benefit of this invention is that it yields the means for providing information for QoS control of GBR traffic to the C-RNC while optimally using Iub interface resources.

In the following different embodiment of the invention will be outlined under reference to FIG. 11 to 16.

Figure 11:
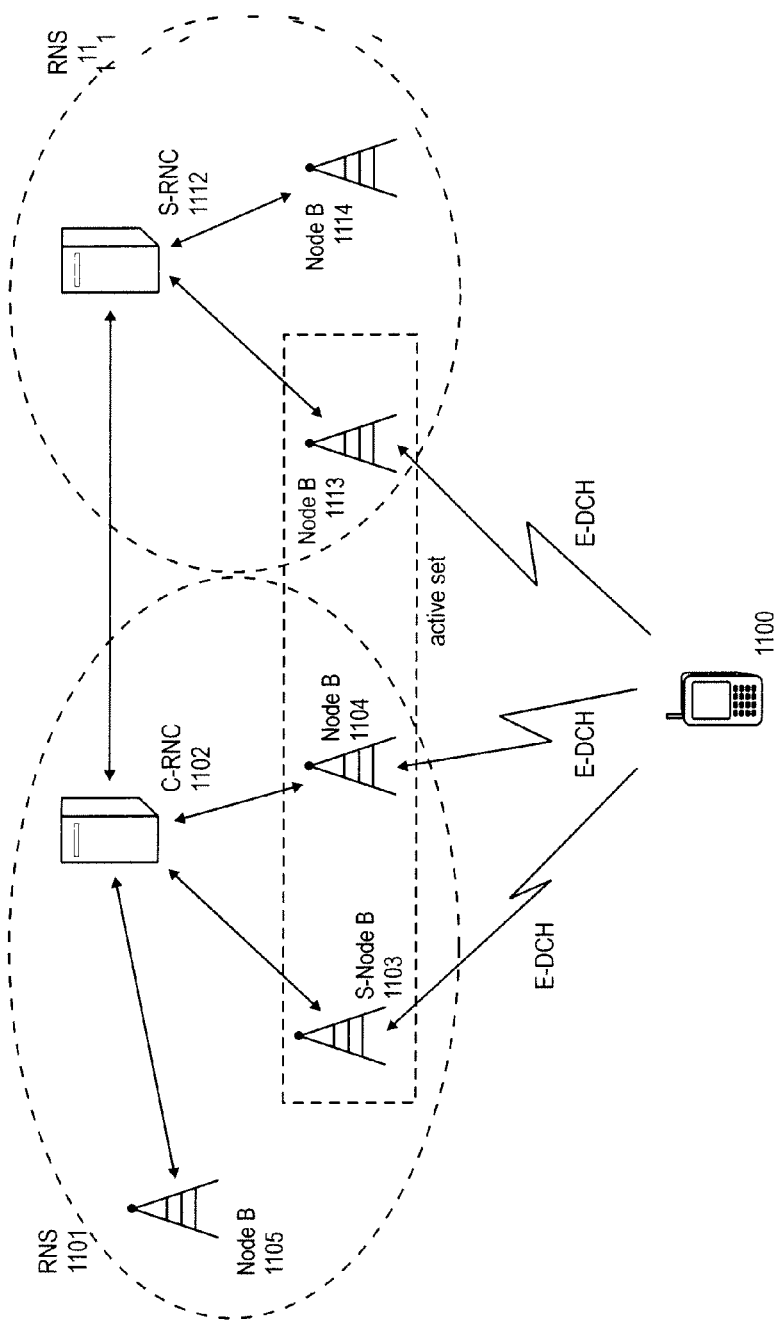
FIG. 11 shows a first scenario for providing dedicated measurements on scheduled data of one or more priority classes of a user equipment to a C-RNC according to an embodiment of the invention.

FIG. 11 shows a first scenario for providing dedicated measurements on scheduled data of one or more priority classes of a single user equipment to a C-RNC according to an embodiment of the invention. The UE 1100 is thereby in soft handover and its active set comprises the S-Node B 1103, being the Node B of the serving cell, i.e. the serving Node B, and Node Bs 1104 and 1113. The Node Bs 1103, 1104 and 1105 are part of the radio network subsystem (RNS) 1101 and are connected to the C-RNC 1102. The UE 1100 communicates via E-DCHs with the Node Bs 1103 and 1104 during soft handover.

Further, the UE 1100 is connected to a second RNS 1111 via Node B 1113. Node Bs 1113 and 1114 are both connected to the S-RNC 1112. Moreover, S-RNC 1112 and C-RNC 1102 are connected to each other.

Figure 12:
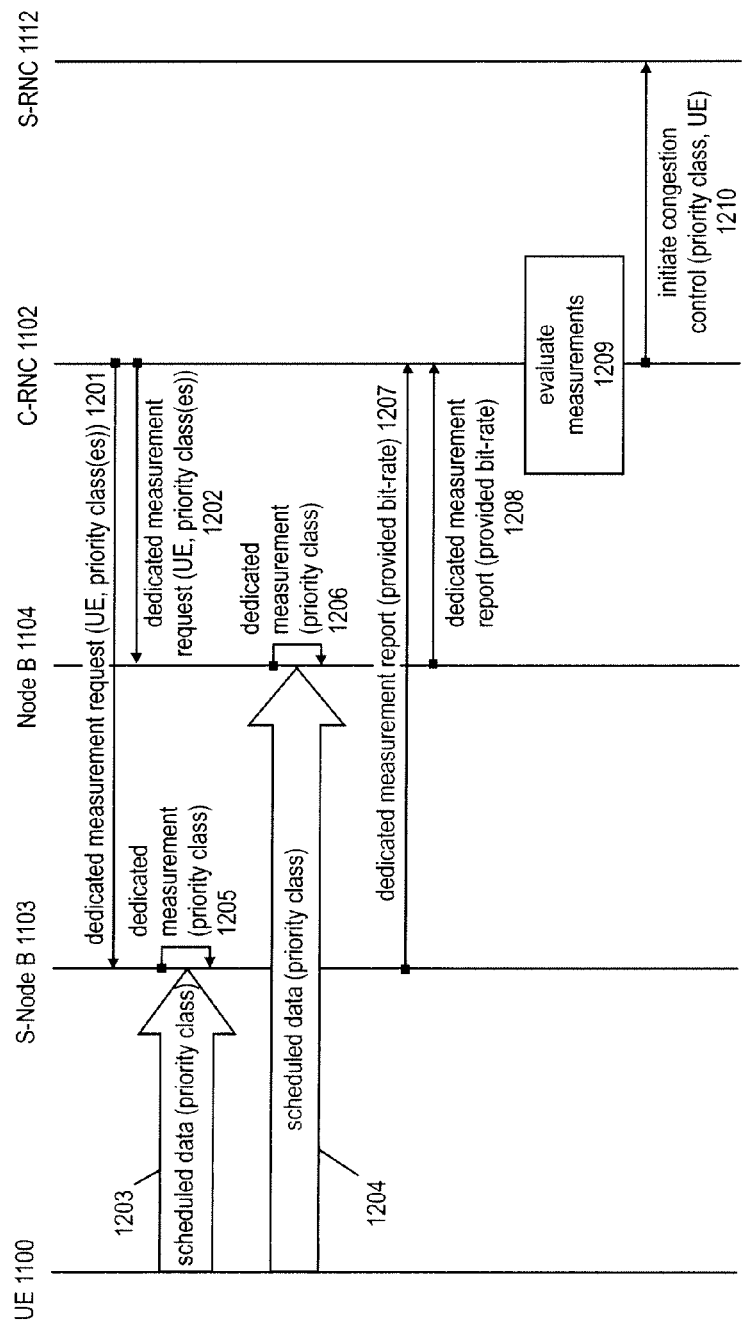
FIG. 12 shows a message flow diagram of dedicated measurement reporting from Node Bs to the C-RNC according to an exemplary embodiment of the invention.

FIG. 12 shows a message flow diagram of measurement reporting from Node Bs 1103 and 1104 to the C-RNC 1102 according to an exemplary embodiment of the invention.

A dedicated measurement procedure is used by a C-RNC 1102 to request the initiation of measurements on dedicated resources in a Node B. The C-RNC 1102 thereby transmits 1201, 1202 a dedicated measurement request to each of the Node Bs 1103 and 1104. This request comprise an identification of the UE 1100 being in handover for which the dedicated measurements are to be performed. Moreover, the request may also indicate one or more priority classes on which S-Node B 1103 and Node B 1104 should report on.

The UE 1100 in handover transmits 1203, 1204 scheduled data of a guaranteed bit-rate priority class to Node Bs 1103 and 1104 respectively. Both Node Bs 1103 and 1104 determine 1205, 1206 the bit-rate provided to a respective MAC-d flow of each priority class for which dedicated measurements are to be performed and send 1207, 1208 the measured provided bit-rates to the C-RNC 1102 in a dedicated measurement report message.

Upon reception of these messages the C-RNC may evaluate 1209 the measurements. For each scheduled data transmission of a guaranteed bit-rate priority class reported on by a respective one of Node Bs 1103 and 1104 the C-RNC 1102 determines whether one of the Node Bs may provide a bit-rate to the scheduled data of a respective priority class that is higher than the bit-rate guaranteed to the scheduled data (guaranteed bit-rate). If none of the Node Bs 1103, 1104 may provide a sufficiently high bit-rate to the scheduled data, the C-RNC 1102 may indicate 1210 to the S-RNC 1112 to perform congestion control as will be described further down below in more detail.

Moreover, in addition the C-RNC 1102 may also decide not to admit new UEs to the guaranteed bit-rate priority class for an insufficiently high provided bit-rate has been reported. Thus, the C-RNC 1102 may block all requests for radio links that should transport on an E-DCH scheduled data of the "congested" guaranteed bit-rate priority class until the invoked congestion control mechanisms make an impact an S-Node B 1103 and/or Node B 1104 indicate in a subsequent measurement report that the guaranteed bit-rate to the scheduled data of the priority class may now (again) be provided on the uplink.

Also in the latter respect, it may be feasible if the dedicated measurement requests provided 1201, 1202 indicate whether the Node Bs 1103, 1104 receiving the request should provide their dedicated measurement reports immediately, event-triggered or periodic. The dedicated measurement value, i.e. the measured provided bit-rate, may be contained in the Group of the [NBAP] Dedicated Measurement Report message.

I.e. example during soft handover operation, only a subset of the Node Bs within active set may be conducting reporting.

According to a further embodiment of the invention the only Node B sending measurement reports may be serving Node B 1103 as this network element may set the upper-most limit for data rate on the uplink.

In an alternative embodiment of the invention only a subset of a UE's active set may be selected to report on the provided bit rate being provided to scheduled data transmissions of the UE 1100 of at least one guaranteed bit-rate priority class. For example, the Node B or a subset of Node Bs of the active set having best uplink channel quality may be selected by the C-RNC 1102 for providing dedicated measurement reports. In this case it may be ensured that Node Bs having the highest amount of correctly received MAC-e PDUs send measurement reports to the C-RNC.

The selection of a subset of active set Node Bs or Serving Node B of a UE for reporting may for example be accomplished by selectively sending [NBAP] DEDICATED MEASUREMENT INITIATION REQUEST message to the subset's Node Bs or the S-Node B 1103.

Figure 13:
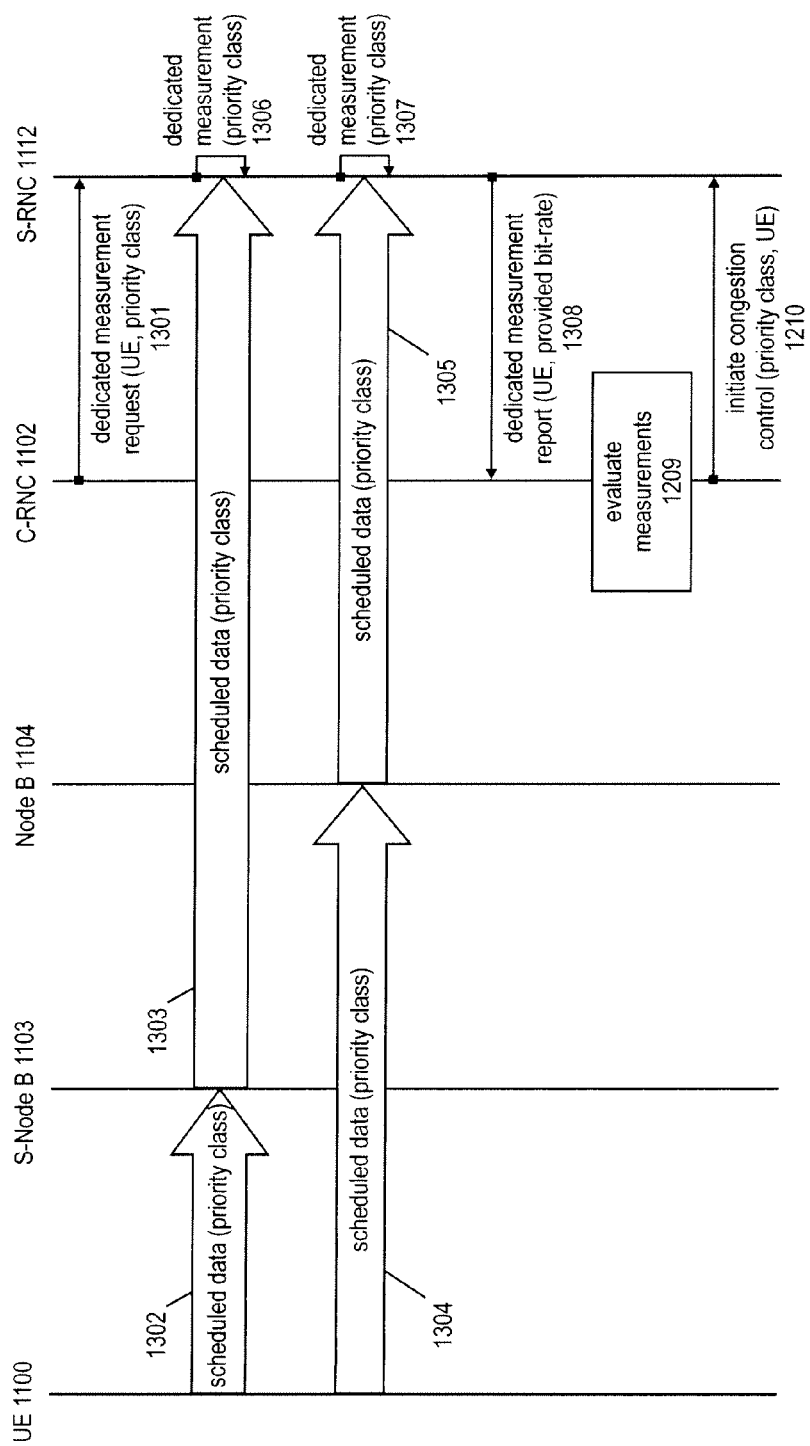
FIG. 13 shows a message flow diagram of dedicated measurement reporting from the S-RNC to the C-RNC according to another exemplary embodiment of the invention.

FIG. 13 shows a message flow diagram of measurement reporting from the S-RNC 1112 to the C-RNC 1102 according to another exemplary embodiment of the invention.

In this embodiment the [RNSAP] procedures as specified in the UMTS standard are changed in that the C-RNC 112 (DRNC) may request dedicated measurement reporting from S-RNC and that S-RNC may report to C-RNC (DRNC).

For this purpose the C-RNC 1102 may send 1301 a dedicate measurement request message to the S-RNC 1112. This request may comprise the UE(s) and at least one guaranteed bit-rate priority class for each UE the S-RNC 1112 should report on.

For this purpose, a Dedicated Measurement Type as a Group of the [RNSAP] DEDICATED MEASUREMENT INITIATION REQUEST message may define a new type of measurement to be executed and may be added to the request message.

A dedicated measurement request message may further comprise Cell IDs (C-IDs) of Node Bs. These Cell IDs may indicate to the S-RNC 1112 to report on the scheduled data received via the Node Bs cells of which are identified by the Cell IDs. Thus, by this means the C-RNC 1102 may again specify a subset or an individual Node B, such as the S-Node B 1103 and may thus selectively request dedicated measurements for on a priority class for individually selected radio cells of the UE's active set during handover.

The Cell IDs may be e.g. added to a CHOICE Dedicated Measurement Object Type Group of the [RNSAP] DEDICATED MEASUREMENT INITIATION REQUEST message.

The UE 1100 provides 1302, 1303, 1304, 1305 scheduled data of a guaranteed bit-rate priority class to the S-RNC 1112 via Node Bs 1103 and 1104. The S-RNC 1112 measures 1306, 1307 the respective bit-rate provided to the scheduled data of the guaranteed bit-rate priority class by a respective one of Node Bs 1103 and 1104 and reports 1308 the measured provided bit-rates to the C-RNC 1102 in at least one dedicated measurement report message.

Alternatively, the S-RNC 1112 may also perform macro diversity combining of the scheduled data of the guaranteed bit-rate priority class and may determine the provided bit-rate to the scheduled data after macro diversity combining (MDC). In this case however, no radio link specific provided bit-rates will be available to the C-RNC 1102 but only an aggregated measurement result of the overall provided bit-rate on the E-DCH for the scheduled data of the guaranteed bit-rate priority class. The dedicated measurement request provided 1301 by the C-RNC 1102 may thus further comprise an indication, e.g. another mandatory information element (IE) which indicates whether measurements before or after macro diversity combining are desired by the C-RCN 1102.

For providing the measurement results in the exemplary embodiments shown in FIG. 12 and FIG. 13, the provided bit-rate may be comprised in IE 'E-DCH Provided Bit-rate' or 'E-DCH Provided Bit-rate after MDC' as a part of Dedicated Measurement Type Group within a dedicated measurement report message. The presence of one of these IEs may for example be mandatory for a dedicated measurement report message transmitted by the S-RNC 1112. E.g. the IE 'E-DCH Provided Bit-rate' may be used for requesting measurements on provided bit-rate per priority, per UE and per cell before macro diversity combining. Similarly, the IE 'E-DCH Provided Bit-rate after MDC' may be used for requesting measurements on provided bit-rate per priority and per UE after macro diversity combining.

The E-DCH provided bit-rate value for scheduled data may be defined as total amount of MAC-d PDU bits per priority class transmitted over the radio interface during a measurement period, divided by the duration of the measurement period. Only bits from acknowledged MAC-e PDUs should be taken into account when calculating this value.

The 'E-DCH Provided Bit-rate Value Information' may be a Group of the [RNSAP] DEDICATED MEASUREMENT REPORT message which conveys the E-DCH provided bit-rate value. The group may comprise the IE 'Priority Indication' which identifies the priority class of E-DCH MAC-d flow and should be mandatory present, the IE 'E-DCH Provided Bit-rate value' which may also be of mandatory presence.

E-DCH provided bit-rate value may contain total provided bit-rate for GBR traffic per priority class, per user and per cell or total provided bit-rate per priority and per user after macro diversity combining.

Upon receiving the measurement results at the C-RNC 1102, the C-RNC 1102 may evaluate 1209 the measurement results and may invoke 1210 congestion control if necessary, as outlined with reference to FIG. 12 above.

In the various embodiments of the invention outlined with respect to FIGS. 11, 12 and 13 above, dedicated measurements on individual UEs have been illustrated.

Another embodiment of the invention foresees that the S-Node B 1103 has been chosen by the C-RNC 1102 to report on the bit-rate provided to a guaranteed bit-rate priority class. In this embodiment, the S-Node B 1103 may individually report on all UEs within its cell that transmit scheduled data of this respective priority class via an E-DCH.

Alternatively, the S-Node B 1103 may also report on all UEs which transmit scheduled data on an E-DCH associated to one of a plurality of guaranteed bit-rate classes and which share the S-Node B 1103 as a serving Node B during soft handover. As explained above, the priority class may also be referred to as a scheduling priority indicator of a particular priority queue. Thus, in other words, the S-Node B 1103 may report on a subset of UEs transmitting scheduled data of a guaranteed bit-rate priority class associated to a scheduling priority indicator higher than a predetermined threshold value. In the latter case it may be assumed that all traffic classes having a guaranteed bit-rate are associated to high scheduling priority indicators. For example, all guaranteed bit-rate priority classes may have a scheduling priority indicator larger than 13—usually the scheduling priority indicator is a value between 1 (lowest priority) and 15 (highest priority).

Further, it should be noted that it is of course also possible that the dedicated measurement requests transmitted by the C-RNC 1102 to Node Bs or the S-RNC 1102 indicate more than one UE to report on and/or more than one guaranteed bit-rate priority class to report on for each UE.

Next, further embodiments of the invention will be discussed with respect to FIGS. 14, 15 and 16. These embodiments mainly relate to the use of common measurement procedures performed by at least one Node B or the S-RNC. The results of these measurements may be provided to the C-RNC for evaluation.

Figure 14:
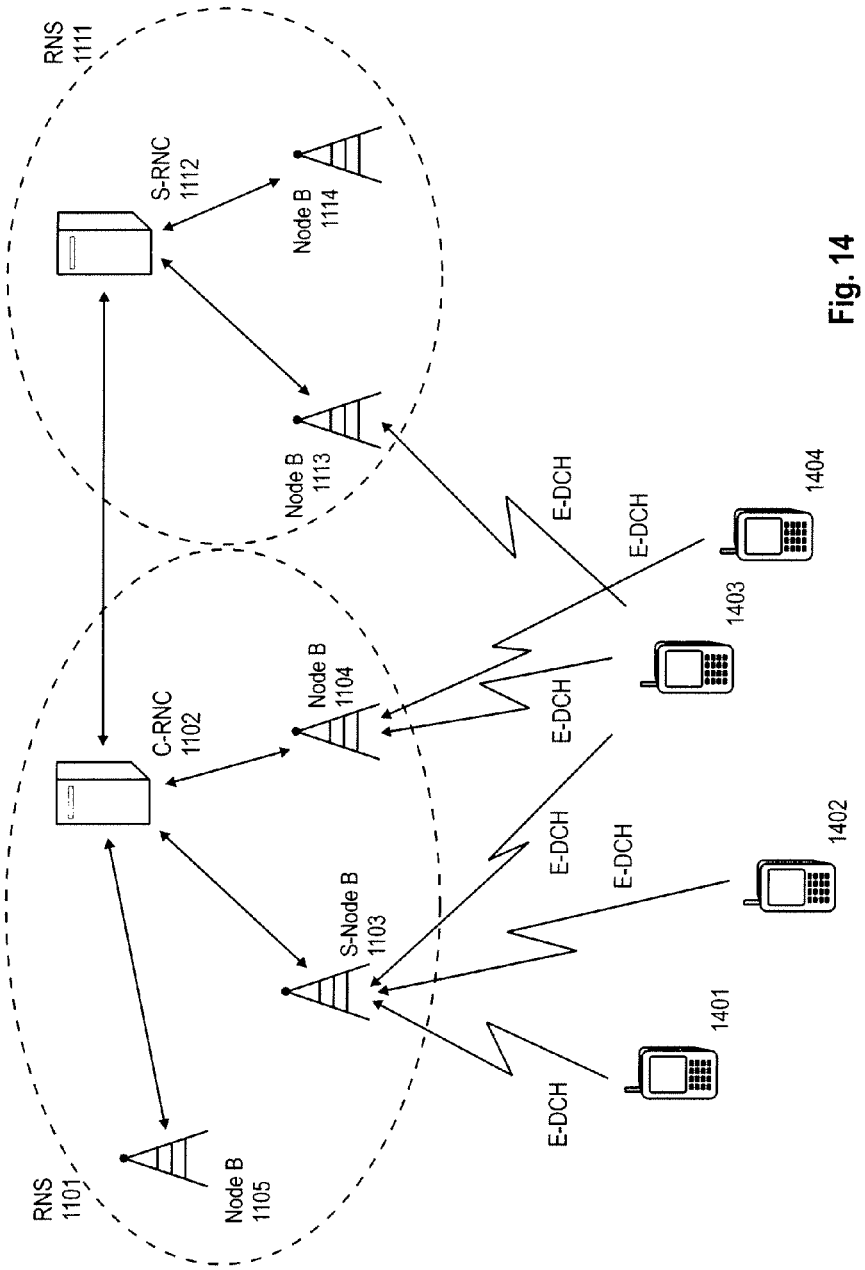
FIG. 14 shows a second scenario for providing common measurements on scheduled data of one or more priority classes transmitted by a plurality of user equipments to a C-RNC according to an embodiment of the invention.

FIG. 14 shows a second scenario for providing common measurements on scheduled data of one or more priority classes transmitted by a plurality of user equipments 1401, 1402, 1403, 1404 to a C-RNC 1102 according to another embodiment of the invention. The UE 1403 is thereby in soft handover and its active set comprises the S-Node B 1103, being the Node B of the serving cell, i.e. the serving Node B, and Node Bs 1104 and 1113. The Node Bs 1103, 1104 and 1105 are part of the radio network subsystem (RNS) 1101 and are connected to the C-RNC 1102. The UE 1100 communicates via E-DCHs with the Node Bs 1103 and 1104 during soft handover.

The other UEs 1402, 1402 and 1404 provide scheduled data via a dedicated uplink data channel such as E-DCH to a respective one of Node Bs 1103 and 1104. In this exemplary scenario it is assumed for exemplary purposes that the scheduled uplink data transmitted by the UEs 1401, 1402, 1403, 1404 are all of the same priority class.

UE 1403 is further connected to a second RNS 1111 via Node B 1113. Node Bs 1113 and 1114 are both connected to the S-RNC 1112. Moreover, S-RNC 1112 and C-RNC 1102 are connected to each other.

Figure 15:
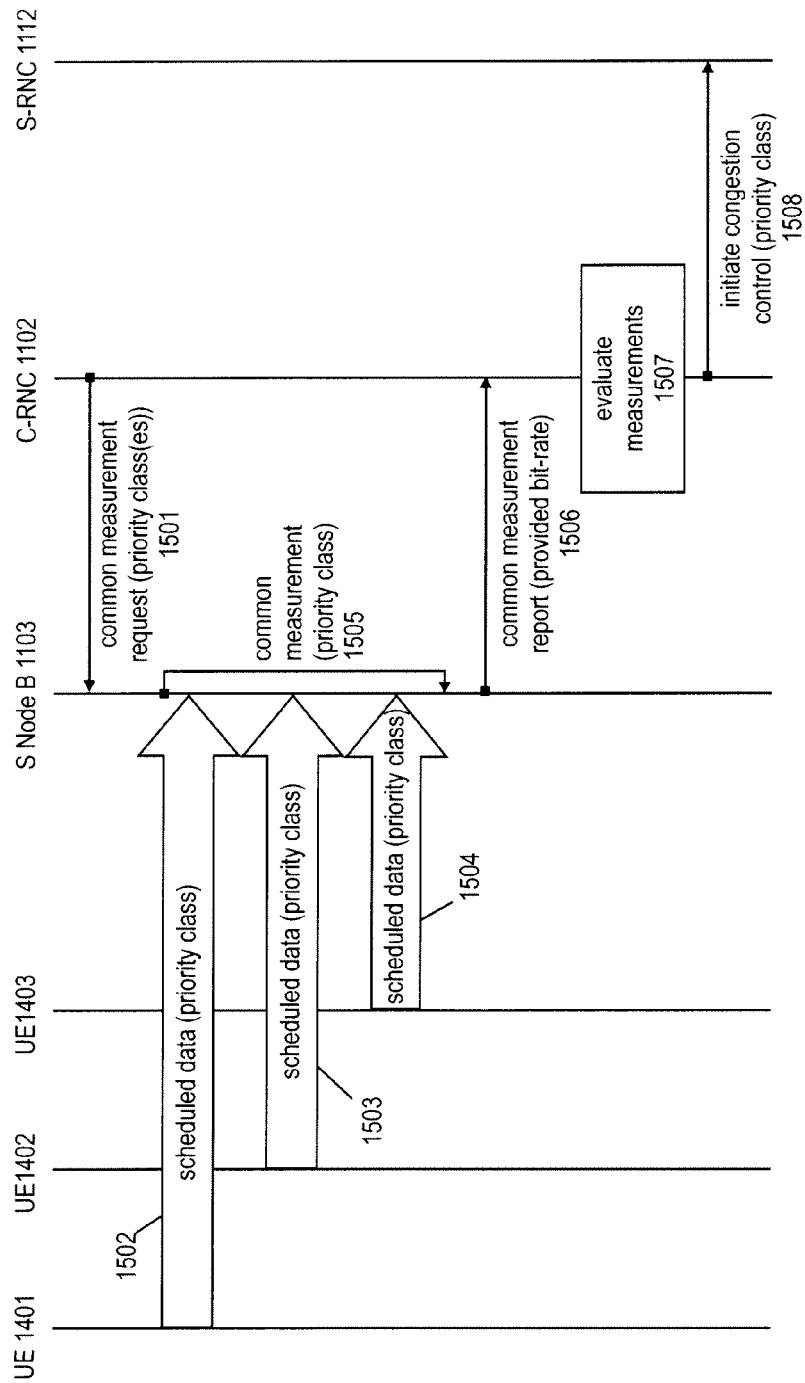
FIG. 15 shows a message flow diagram of common measurement reporting from the S-Node B to the C-RNC according to another exemplary embodiment of the invention.

FIG. 15 shows a message flow diagram of common measurement reporting from the S-Node B 1103 to the C-RNC 1102 according to another exemplary embodiment of the invention.

According to this embodiment of the invention, the C-RNC 1102 initiates a common measurement procedure by sending 1501 a common measurement request to the S-Node B 1103. The request indicates at least one guaranteed bit-rate priority class on which the S-Node B 1103 is requested to report on. As outlined for the dedicated measurement procedures described above, also common reporting can be configured to be immediate, event-triggered or periodic.

In order to define the type of the measurement to be performed by the S-Node B 1103 the C-RNC 1102 may include a so-called Common Measurement Type in the request. A Common measurement Type is a Group of the [NBAP] COMMON MEASUREMENT INITIATION REQUEST message defining the type of measurement to be executed. For common measurements specific for E-DCH a new IE 'Total E-DCH Provided Bit-rate' may be defined as a part of Common Measurement Type Group. The presence of this IE may for example be mandatory.

In case of this exemplary embodiment, only the S-Node B 1103 is configured to provide common measurements on the bit-rate being provided to a certain guaranteed bit-rate priority class within the serving cell controlled by the S-Node B 1103. In an alternative embodiment of the invention it is also possible that more than one Node B, for example S-Node B 1103 and Node B 1104 report on the bit-rate provided to a guaranteed bit-rate priority class in the cell controlled by S-Node B 1103 or Node B 1104, respectively.

In respect to these two embodiments described above, it is important to notice that for common measurement reporting from at least one Node B to the C-RNC 1102, the at least one Node B is a Node B within the active set of the UE 1104 being in soft handover. As will be explained in the following in more detail the common measurement reports provided by the at least one Node B, e.g. S-Node B 1103 in the exemplary embodiment of FIG. 12, allow the C-RNC 1102 to determine the bit-rate provided to scheduled data of a guaranteed bit-rate priority class within the cell(s) controlled by the at least one Node B. Based on this information the C-RNC 1102 may decide whether a requested QoS—e.g. in terms of the guaranteed bit-rate—may be fulfilled within a specific radio cell/radio cells of the UE 1403's active set. If not, appropriate actions such as congestion control may be initiated by the C-RNC 1102.

Turning now back to FIG. 15, the UEs 1401, 1402 and 1403 transmit 1502, 1503, 1504 scheduled data of the guaranteed bit-rate priority class to the S-Node B 1103. The S-Node B 1103 measures 1505 the overall provided bit-rate to data of said priority class using common measurement procedures. Thereby an E-DCH Provided Bit-Rate Information is determined by the S-Node B 1103 and transmitted 1506 within a common measurement report to the C-RNC 1102.

As already indicated above, the E-DCH provided bit-rate information for scheduled data may be defined as total amount of MAC-d PDU bits per guaranteed bit-rate priority class transmitted over the radio interface during a measurement period, divided by the duration of the measurement period. Only bits from acknowledged MAC-e PDUs are taken into account. This E-DCH provided bit-rate information is used for definition of the Total E-DCH Provided Bit-rate Value Group of the [NBAP] COMMON MEASUREMENT REPORT message. As becomes apparent from this definition, the dedicated measurement procedure reports on individual (i.e. per UE) bit-rates provided to a priority class while the common measurements report on the total bit-rate or overall bit-rate provided to all UEs of the respective priority class within a radio cell.

In addition to the provided bit-rate parameter value, the S-Node B 1103 may also determine a list of costly UEs transmitting scheduled data of the guaranteed bit-rate priority class to be reported on within its serving cell that contribute significantly to the noise rise within the serving cell.

In an exemplary embodiment of the invention, this list of costly UEs may be defined based on used TFC statistics during a single measurement period. For example, E-TFC statistics may be used to define cost of a UE j during the measurement period of N·TTI by means of the equation:

$$C_j = \frac{1}{N} \sum_{i=1}^{N} W_i \frac{E - TFC_i[\text{bit}]}{E - TFC_i^{max}[\text{bit}]}.$$

E-TFC$_i^{max}$ corresponds to the E-TFC (Enhanced-Transport Format Combination) of the respective UE with a maximum number of bits, while $W_i$ denotes factor corresponding to the gain factors ("boosting" or "nominal" mode of the UE).

The value of the IE 'E-DCH Provided Bit-rate Value' Group is determined in Layer-2 measurement procedures. However, it is also possible to include this IE in Layer-1 measurement signaling.

Another definition of a costly UE may be chosen as follows. A 'costly' UE is a UE whose predefined E-TFC statistics for dedicated uplink transmission observed during a measurement interval has exceeded certain threshold. Simplified, the costly UEs may be those UEs which significantly contribute to the noise rise on the uplink for a given radio cell.

The common measurement results of the S-RNC 1103 in the exemplary embodiment of the invention according to FIG. 12 may be comprised in a so-called E-DCH Provided Bit-rate Value Information. This E-DCH Provided Bit-rate Value Information may define a Group of the [NBAP] COMMON MEASUREMENT REPORT message. The group should comprise following IE 'Priority Indication' which may identify the priority class of E-DCH MAC-d flow reported on and the IE "E-DCH Provided Bit-rate value" as defined above. These two IEs may for example be mandatory.

Further, the group may further comprise an optional or mandatory IE 'List of costly UEs' which list the costly UEs within the cell controlled by the reporting Node B. The list of costly UEs may comprise UEs causing particularly high RoT by their uplink transmissions in the sense captured by the equation above or similar. Based on the list of costly UEs, C-RNC 1102 may initiate reconfiguration of resources assigned to E-DCHs. Another option for the C-RNC 1102 may be to perform a MAC-d flow pre-emption for costly UEs or a switching of the costly UEs' traffic from an E-DCH to a legacy uplink DCH. The list of costly UEs may be a part of Group associated with Layer-1 measurements as well. This information is shown in the table below.

| IE/Group Name | Presence | Range | IE type and reference |
| --- | --- | --- | --- |
| Total E-DCH Provided Bit-rate Value Information | | tbd | |
| >Priority Indication | M | tbd | tbd |
| >E-DCH Provided Bit-rate Value | M | tbd | tbd |
| > List of costly UEs | M/O | tbd | tbd |
| (tbd = to be defined) | | | |

Figure 16:
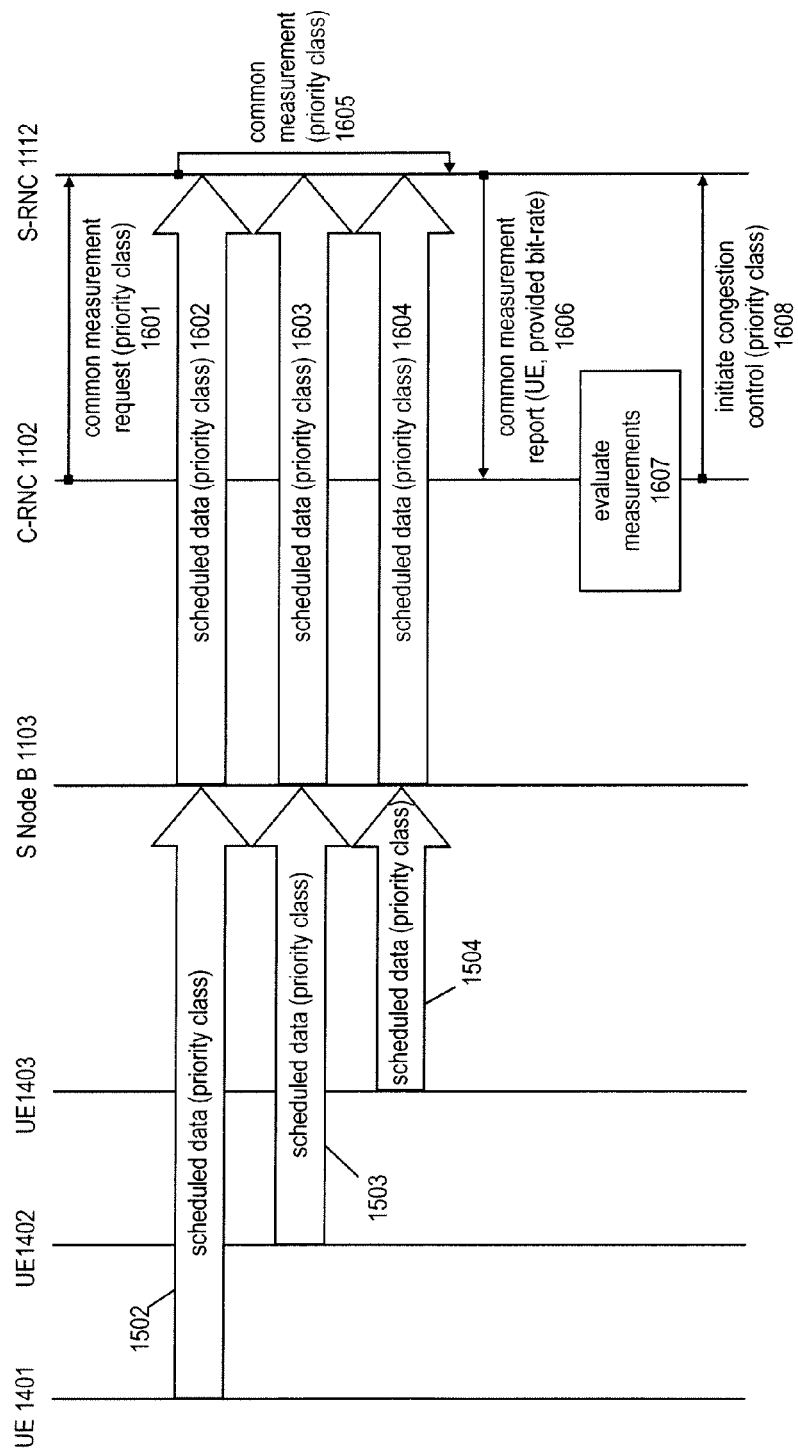
FIG. 16 shows a message flow diagram of common measurement reporting from the S-RNC to the C-RNC according to another exemplary embodiment of the invention.

FIG. 16 shows a message flow diagram of common measurement reporting from the S-RNC 1112 to the C-RNC 1102 according to another exemplary embodiment of the invention.

The common measurements are initiated by the C-RNC 1102 by sending 1601 a common measurement request message to the S-RNC 1112. Common measurement reporting on the provided bit-rate to scheduled data of a specified guaranteed bit-rate priority class from S-RNC 1112 may use a [RNSAP] Common Measurement Reporting Procedure. The C-RNC 1102 may request S-RNC 1112 to report the results of measurements as requested by C-RNC 1102 by [RNSAP] COMMON MEASUREMENT INITIATION REQUEST message.

Figure 10:
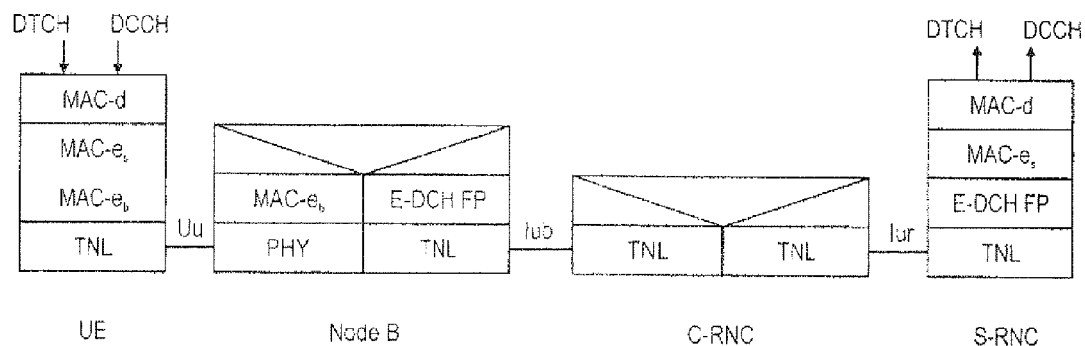
FIG. 10 shows an exemplary transport channel protocol model for an E-DCH with Iur mobility.

The request may for example indicate the priority class the S-RNC 1112 should report on and at least one Node B of the UE 1403's active set during soft handover. The UEs 1401, 1402, and 1403 all transmit 1502, 1503, 1504 scheduled data of this priority class via the S-Node B 1102 to the S-RNC 1112 (see 1602, 1603, 1604). The S-RNC 1102 may provide the scheduled data of the priority class to the S-RNC 1112 using the E-DCH FP as for example illustrated in FIG. 10 and FIG. 17. Thus, the S-RNC 1112 may differentiate the data transmitted by the respective UEs and by respective Node Bs in case more than one Node B is configured to be reported on by the common measurement request from the C-RNC 1102.

The C-RNC 1102 may select an individual Node B or a subset of Node Bs of the UE 1403's active set which should provide common measurement reports for data of a guaranteed bit-rate priority class. The selection of this subset of active set Node Bs or the selection of a single Node B of a UE only (such as S-Node B 1103 in the exemplary embodiment of FIG. 16) for reporting may be done by listing the respective Cell IDs (C-IDs) of the selected Node B(s) in a [RNSAP] DEDICATED MEASUREMENT INITIATION REQUEST message.

Again the type of the measurement to be performed by the S-RNC 1112 may be defined in a specific Common Measurement Type. The Common Measurement Type is a Group of the [RNSAP] COMMON MEASUREMENT INITIATION REQUEST message defining the type of measurement to be executed. Common measurements specific for E-DCH may be achieved by defining a new IE 'Total E-DCH Provided Bit-rate' as a part of Common Measurement Type Group. The presence of this IE may for example be mandatory. The IE 'Total E-DCH Provided Bit-rate' may be also used for requesting measurements on total provided bit-rate for GBR traffic per priority class and per cell.

Returning to FIG. 16, the S-RNC 1112 may perform 1605 a common measurement procedure to determine the bit-rate provided to the scheduled data of the guaranteed bit-rate priority class within the radio cell of the S-Node B 1102.

The results of the measurement may be reported 1606 to the C-RNC 1102 in a common measurement report. As indicated above with respect to the embodiment of the invention shown in FIG. 15, also the common measurement results of this embodiment may be provided in an E-DCH Provided Bit-rate Value Information. The E-DCH Provided Bit-rate Value Information may specify a Group of the [RNSAP] COMMON MEASUREMENT REPORT message transmitted from the S-RNC 1112 to the C-RNC 1102. The group should comprise following IE 'priority indication' for identifying the priority class of E-DCH MAC-d flow and the IE 'E-DCH Provided Bit-rate value'. As explained previously, these IEs may be mandatory. Further, also the report from the S-RNC 1112 may comprise and additionally optional or mandatory IE 'List of costly UEs' as explained above with respect to FIG. 15.

Though it has been indicated in the embodiments above, that the dedicated/common measurement request may only indicate a single guaranteed bit-rate priority class, it should be noted that the measurement request may also comprise a range of priority classes having scheduled guaranteed bit-rate traffic or a plurality of guaranteed bit-rate priority classes may be identified in the request and may be reported on by the respective reporting network element(s). Further, it should be noted that for the embodiments relating to S-RNC 1112 reporting to the C-RNC 1102 it is not required that the UE or one of the UEs reported on are in soft-handover.

The following table illustrates the options on the different measurements that may be initiated by the C-RNC 1102 in the different embodiments outlined above.

|  | Node B to C-RNC 1102 | S-RNC 1112 to C-RNC1102 |
| --- | --- | --- |
| Dedicated measurement procedure | Provided bit-rate per priority class per UE (per cell) | Provided bit-rate per priority class per UE per cell Provided bit-rate per priority class per UE after MDC |
| Common measurement procedure | Total provided bit-rate per priority class per cell | Total provided bit-rate per priority class per cell |

As has been explained in the previous sections, measurement reporting for congestion control may be done for example by means of [NBAP] COMMON/DEDICATED MEASUREMENT REPORT message. When it is discovered in the C-RNC 1102 that there is no satisfactory fulfillment of QoS requirements, it may decide to invoke congestion control. There are several ways to do this, depending on whether the total RoT resources in a Node B dedicated to E-DCH of a UE is sufficient to handle MAC-d flow at the given QoS requirements (e.g. guaranteed bit-rate) or not.

In case the total RoT resources that can be dedicated to E-DCH by the Node B (maxRoT) are insufficient to handle MAC-d flow, the C-RNC 1102 may initiate a MAC-d flow pre-emption. This may for example be achieved by sending a [RNSAP] RADIO LINK PREEMPTION REQUIRED INDICATION message to the S-RNC 1112. After receiving the message from the C-RNC 1102, the S-RNC 1112 may stop the flow of data on Radio Bearers that are associated to logical channels that are associated to the MAC-d flows that are to be preempted.

In case the total RoT resources in the Node B that can be dedicated to E-DCH (maxRoT) are sufficient to handle MAC-d flow, the C-RNC 1102 may inform the S-RNC 1112 on the situation. For example, this may be achieved by sending a [RNSAP] RADIO LINK CONGESTION INDICATION message to the S-RNC 1112. This congestion indication message may for example comprise an indication of the guaranteed bit-rate priority class for which congestion control is performed, e.g. a MAC-d flow ID.

Figure 7:
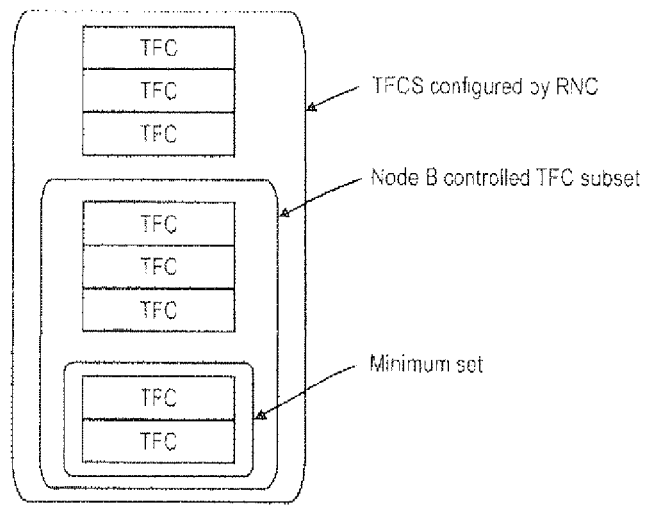
FIG. 7 shows the exemplary TFC set configured by the RNC and illustrates the Node B controlled TFC subset for Node B controlled scheduling.
Figure 8:
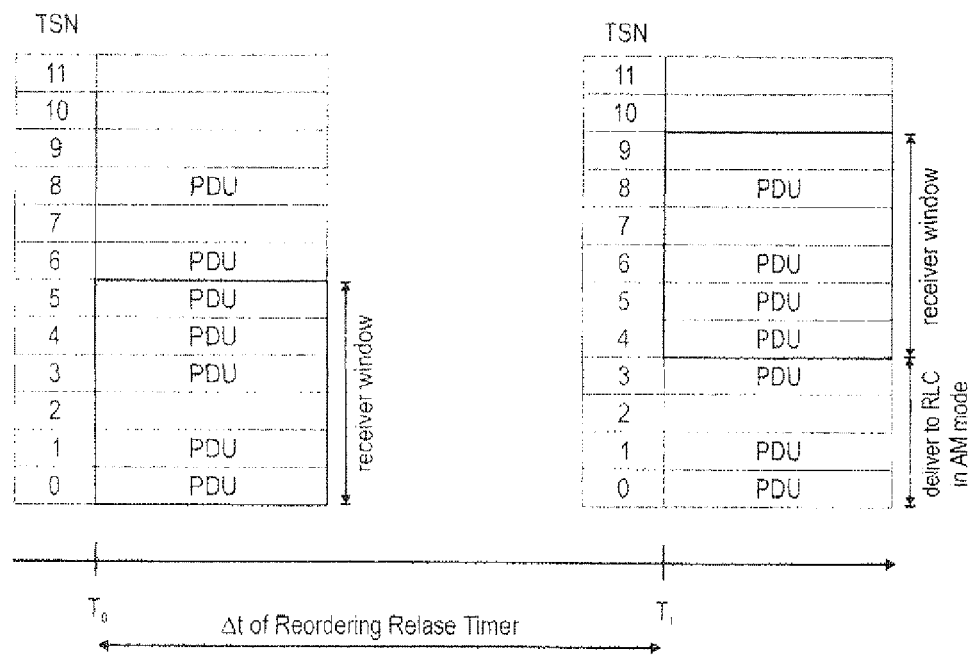
FIG. 8 shows an operation of the reordering function in an RNC.
Figure 9:
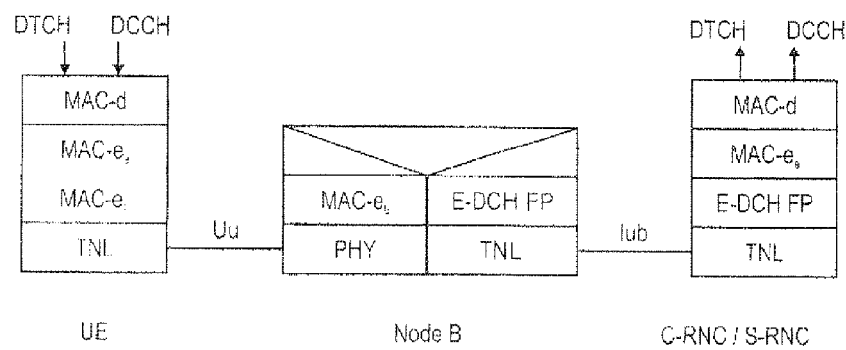
FIG. 9 shows an exemplary transport channel protocol model for an E-DCH without Iur mobility.

If the S-RNC controlled E-TFC set provides sufficiently high data rates, the Node B controlled E-DCH resources may be reconfigured by the S-RNC 1112 for example by means of [NBAP] RADIO LINK RECONFIGURATION REQUEST message transmitted to the respective Node B. This message will reconfigure the Node B controlled TFC subset (see FIG. 7) such that it may become possible to provide the scheduled data of the priority class at the guaranteed bit-rate or even a higher bit-rate.

If however the S-RNC controlled E-TFC set does not allow for sufficiently high data rates, the S-RNC 1112 may need to reconfigure the RNC controlled E-TFC set in the respective UE for example by sending [RRC] E-TFC RECONFIGURATION REQUEST message. The Node B controlled E-DCH resources may be reconfigured by means of [NBAP] RADIO LINK RECONFIGURATION REQUEST message afterwards as explained above.

In addition to performing congestion control or alternatively thereto, the C-RNC 1102 may also handle admission control to services implying uplink traffic of a guaranteed bit-rate priority class based on the measurement results received from the at least one Node B or the S-RNC 1112.

The C-RNC 1102 may utilize measurement reports to make a decision on whether to admit the new user or not. For example, if total provided bit-rate per priority class for a common measurement procedure is less than required bit-rate (guaranteed bit-rate) for already admitted users per priority class, the C-RNC 1102 may not admit newly arrived user. Upon detecting a change in the provided bit-rate based on the measurements subsequently received at the C-RNC 1102 may decide to admit new users for example, the latest measurement report(s) indicate that the required bit-rate may be provided to the users of the respective priority class.

Figure 17:
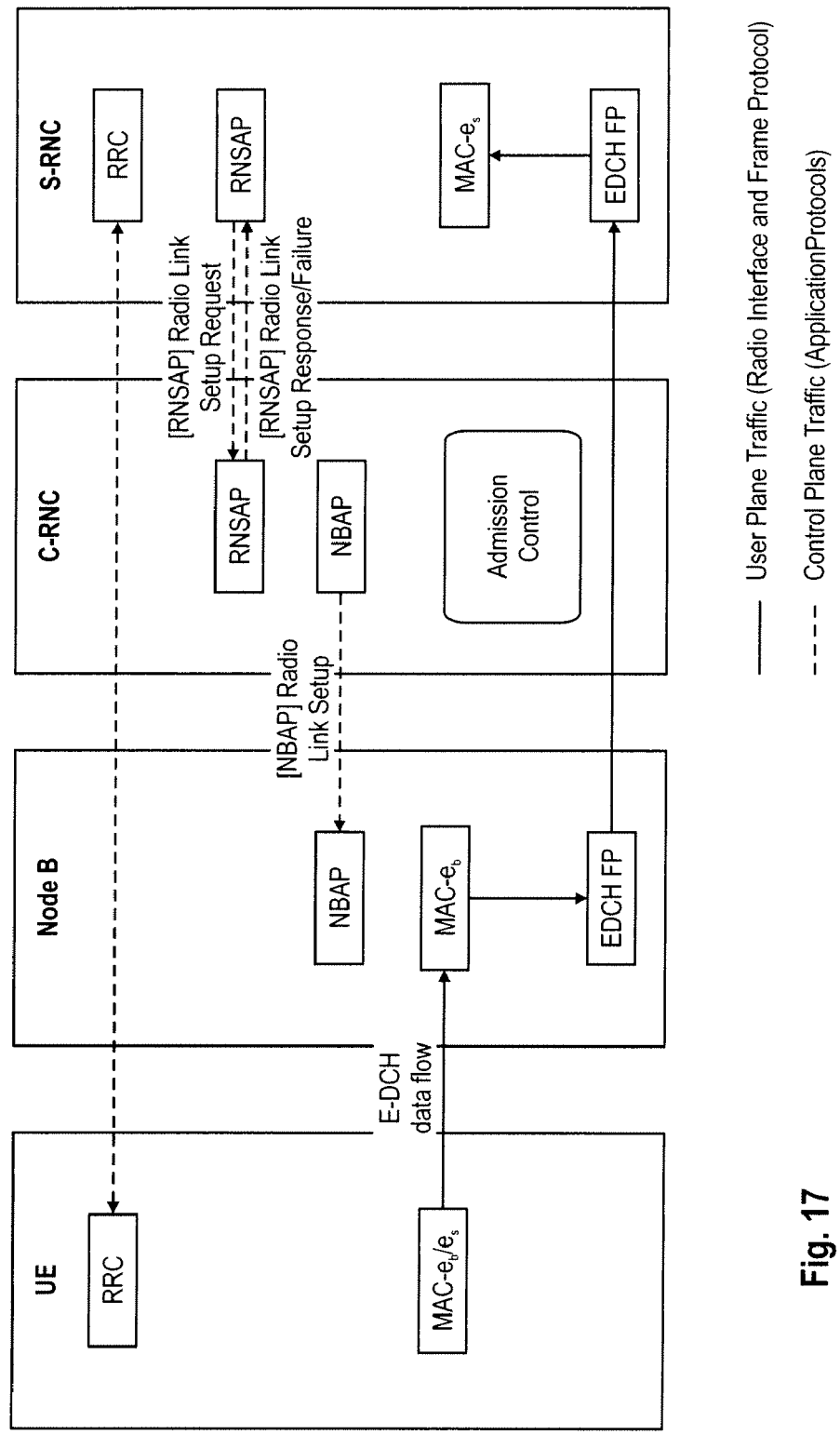
FIG. 17 shows data flow and signaling flow for the admission control performed by the C-RNC.

An example of data and signalling flows for admission control by the C-RNC assuming [NBAP] measurement reporting is shown in the FIG. 17. For example, if a C-RNC has decided not to admit new users for a specific priority class, the C-RNC may for example send Radio Link Setup Failure message to the S-RNC requesting the setup of a new radio link for a user.

In this respect, it should be noted that RoT for a particular E-DCH is constant and regulated by a Node B. The bit-rate for the power offsets assigned to an individual UE may for example be calculated by the UE E-TFC selection algorithm. Therefore, in one embodiment of the invention, the GBR attribute of a user considered for transmission is not be used for admission control.

In the following the E-DCH operation during soft handover according to the embodiments above is considered with respect to an optimization Iub capacity. It may be assumed that reporting is being done by specially selected single Node Bs within active set or by specially selected subset of Node Bs within active set.

During SHO operation measurements may be received by C-RNC 1102 by several Node Bs within the active set of a particular UE 1100, 1403. This may not be particularly efficient form Iub utilization point of view. Therefore, it may be of advantage if dedicated measurements may be configured to be executed by the S-Node B 1103 only given that its commands are the major limiting factor for uplink bit-rate provided to scheduled data transmissions.

Since S-Node B selection is generally UE specific, measurement reporting per serving Node B only is possible for dedicated type of measurements. Provided that the measurements are configured per priority class and per group of users having same serving Node B, this also allows for reporting using common measurement procedures as outlined above. Generally, when trying to optimize the Iub load due to measurements, a decreased Iub load during SHO operation is traded off against decreased accuracy of reporting.

As explained previously, certain UEs having very high priority uplink access over an E-DCH may not be obliged to honor scheduling grant commands from non-serving Node Bs. This may for example allow a further option for optimizing the Iub load implied by the measurements. For example, per S-Node B reporting may be conducted for these "high priority" UEs without any decrease in accuracy of reporting.

Moreover, another possibility for Iub optimization in soft handover operation concerns the situation where other Node Bs than the S-Node B reports measurements. It may be possible that a number of retransmissions of MAC-e PDUs (RSN=Retransmission Sequence Number) is reported along with the respective MAC-e PDUs within DATA FRAMEs of the E-DCH FP.

In an exemplary embodiment of the invention it is assumed that RSN field (or 'N of HARQ Retransm' field) is included in the DATA FRAMEs being sent by each of the Node Bs within active set to the S-RNC and that the E-DCH FP is terminated in the C-RNC 1102. Under the assumption that for a good channel quality less retransmissions of PDUs are required on the uplink than for bad channel uplink channel conditions, the RSN field may be interpreted as an indication of the channel uplink channel quality for a UE in soft handover in a respective radio cell of its active set's Node B. In order to cope with fluctuations in the channel quality, an average reported RSN for a predetermined measurement period may be calculated. Thus, the Node B having best uplink quality within active set may be selected as the one indicating the lowest (average) RSN.

In this exemplary embodiment, the Node B having the best uplink channel quality may be selected as the Node B that should provided measurement results. Alternatively, also more than a single Node B may be also selected, e.g. the two or three Node Bs having the best uplink channel quality. This operation is however applicable to dedicated measurements only.

In another embodiment of the invention it is assumed that E-DCH FP is not terminated in the C-RNC 1102, which requires that the subset of reporting Node Bs within active set/Serving Node B of a UE may be determined by S-RNC 1112. A corresponding indication may be sent to the C-RNC 1102 which may initiate measurements by sending [NBAP] DEDICATED MEASUREMENT INITIATION REQUEST message to selected Node Bs/the selected Node B.

For non-scheduled data of a guaranteed bit-rate priority class only an indication of congestion may be sent from a measuring Node B to the C-RNC 1102. Upon receiving the indication on congestion for non-scheduled data of the priority class the C-RNC 1102 may try to allocate more resources for E-DCH.

It may assumed that serving Node B may internally compress the amount of RoT for scheduled data to free more resources for non-scheduled data as having higher priority but requesting lower delay and lower data rates. Therefore an explicit reporting of a provided bit-rate may not be necessary for non-scheduled data thus contributing to decreasing the load on interfaces.

As described in the last table above, common/dedicated NBAP/RNSAP measurement reporting may be configured. Depending on the information required, certain configuration may be more or less suitable.

For example, for high priority UEs obeying only commands of serving Node B, it may be possible to send a provided bit-rate after MDC to the C-RNC. If the provided bit-rate is lower than requested (guaranteed bit-rate), the C-RNC may reconfigure E-DCH resources assigned to the S-Node B.

In another example, C-RNC may wish to observe common measurements on the total provided bit-rate per priority class and cell or dedicated measurements on the total provided bit-rate per priority class, cell and UE in order to identify those Node Bs within active set of the UE that do not contribute significantly to macro-diversity gain. The C-RNC may further wish to assign more resources to those Node Bs or to recommend to the S-RNC by signaling that those Node Bs are removed from the active set.

It should be noted that Node Bs within active set of the UE that do not contribute significantly to macro-diversity gain may also be derived from RSN field of the E-DCH FP. In case the E-DCH FP is not terminated in the C-RNC, the information from the RSN fields is however not available in C-RNC. In this case the Node Bs selected for reporting may be signaled from S-RNC to C-RNC so that C-RNC can configure the measurements accordingly.

Finally, it should be noted that measurement reporting after MDC provides important information to the C-RNC that cannot be obtained by measurements in this network element even if E-DCH FP were terminated in it. Based on provided bit-rate after MDC, C-RNC can reconfigure E-DCH resource in Node B. For example, if the provided bit-rate is lower than the guaranteed bit-rate, the total amount of RoT assigned to the E-DCH in Node Bs may be changed.

Another embodiment of the invention relates to the implementation of the above described various embodiments using hardware and software. It is recognized that the various above mentioned method steps as well as the various logical entities and modules described above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Thus, for example, it is recognized that the operation of the C-RNC and the S-RNC described in the embodiments of the invention and their variations above may be implemented in hardware and/or software and the functionality of these network elements may also be comprised on a computer readable medium. The various embodiments of the invention may therefore be also implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, memory cards, registers, hard disks, CD-ROM, DVD, etc.

What is claimed is:

1. A method for receiving a measurement in a Universal Mobile Telecommunications System (UMTS) comprising user equipments (UEs) and a Node B connected to a controlling radio network controller, the method comprising:

sending from the controlling radio network controller to the Node B a measurement initiation request message for initiating a measurement on a provided bit-rate being provided to data for each priority class, and receiving at the controlling radio network controller from the Node B and in response to the request message, the measurement on the provided bit-rate being provided to data for each priority class, said data being associated with the priority class and being transmitted on a dedicated uplink data channel by at least one of the user equipments.

2. The method according to claim 1, wherein the provided bit-rate is measured as a common measurement including the provided bit-rates per priority class for all of the user equipments in a cell.

3. The method according to claim 2, wherein a logical channel mapped on the dedicated uplink channel is associated with the priority class.

4. The method according to claim 1, wherein said at least one user equipment is in soft handover.

5. The method according to claim 1, wherein a logical channel mapped on the dedicated uplink channel is associated with the priority class and the measurement indicates the provided bit rate per priority class.

6. The method according to claim 1, wherein the priority class refers to a scheduling priority indicator or a logical channel priority.

7. The method according to claim 1, wherein the measurement is received together with a priority indicator indicating the priority class with which a logical channel mapped on the dedicated uplink channel is associated.

8. The method according to claim 1, wherein the dedicated uplink data channel is an Enhanced Dedicated Channel of a UMTS system.

9. The method according to claim 1, wherein the dedicated uplink data channel is an Enhanced Dedicated Channel of a UMTS system, and for each priority class, the Node B measures the provided bit rate as the total number of MAC-d protocol data unit (PDU) bits whose transmission over the radio interface has been considered successful by MAC-e in the Node B during a measurement period, divided by the duration of the measurement period.

10. A Node B for use in a Universal Mobile Telecommunications System (UMTS) comprising user equipments (UEs) and the Node B connected to a controlling radio network controller, the Node B comprising:

a receiving section configured to receive from the controlling network controller a measurement initiation request message for initiating a measurement on a provided bit-rate for each priority class, a measuring section configured to measure a provided bit-rate being provided to data for each priority class, said data being associated with the priority class and being transmitted on a dedicated uplink data channel by at least one of the user equipments, and a signaling section configured to signal a measurement on the provided bit-rate to the controlling radio network controller.

11. A controlling radio network controller for use in a Universal Mobile Telecommunications System (UMTS) comprising user equipments (UEs) and a Node B connected to the controlling radio network controller, the controlling radio network controller comprising:

a sending section configured to send to the Node B a measurement initiation request message for initiating a measurement on a provided bit-rate for each priority class, and a receiving section configured to receive from the Node B, the measurement on a provided bit-rate being provided to data for each priority class, said data being associated with the priority class and being transmitted on a dedicated uplink data channel by at least one of the user equipments.

* * * * *